US012658137B2

(12) United States Patent
Wen et al.

(10) Patent No.: US 12,658,137 B2
(45) Date of Patent: Jun. 16, 2026

(54) VARIABLE BRIGHTNESS DIMMING OF DISPLAY PERIPHERALS

(71) Applicant: Google LLC, Mountain View, CA (US)

(72) Inventors: Chien-Hui Wen, Mountain View, CA (US); Daniel Solomon, San Jose, CA (US); Ken Kok Foo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/085,116

(22) Filed: Mar. 20, 2025

(65) Prior Publication Data

US 2025/0218380 A1 Jul. 3, 2025

Related U.S. Application Data

(63) Continuation of application No. 18/286,028, filed as application No. PCT/US2022/053848 on Dec. 22, 2022, now Pat. No. 12,272,306.

(51) Int. Cl.
*G09G 3/3233* (2016.01)

(52) U.S. Cl.
CPC ... *G09G 3/3233* (2013.01); *G09G 2300/0819* (2013.01); *G09G 2300/0861* (2013.01);
(Continued)

(58) Field of Classification Search
CPC ......... G09G 3/3233; G09G 2300/0819; G09G 2300/0861; G09G 2310/0262;
(Continued)

(56) References Cited

U.S. PATENT DOCUMENTS 6,791,566 B1 9/2004 Kuratomi et al.
8,698,850 B2 4/2014 Irie et al.
(Continued)

FOREIGN PATENT DOCUMENTS

JP 2007-219034 8/2007
KR 10-2021-0097877 A 8/2021

OTHER PUBLICATIONS

International Search Report and Written Opinion in International Appln. No. PCT/US2022/053848, mailed on Jul. 4, 2023, 20 pages.
(Continued)

*Primary Examiner* — Tom V Sheng
(74) *Attorney, Agent, or Firm* — Fish & Richardson P.C.

(57) ABSTRACT

In general, the subject matter described in this disclosure can be embodied in methods, systems, and program products for presenting display content on a display of a computing system. A method includes selecting, from a collection of luminance profiles that are each configured to reduce brightness of the display content in different manners, a first luminance profile based on the current display brightness setting, the first luminance profile specifying a first amount of brightness reduction to a peripheral portion of the display content and a first gradient of brightness reduction for a portion of the display content between the peripheral portion of the display content and a center portion of the display content; applying the first luminance profile to the display content to modify the display content by reducing a brightness of the display content according to the first luminance profile; and presenting the display content on the display.

19 Claims, 10 Drawing Sheets

(52) U.S. Cl.
CPC ............... *G09G 2310/0262* (2013.01); *G09G 2320/0686* (2013.01); *G09G 2330/021* (2013.01); *G09G 2360/144* (2013.01)

(58) Field of Classification Search
CPC ..... G09G 2320/0686; G09G 2330/021; G09G 2360/144
USPC ............................................................ 345/76
See application file for complete search history.

(56) References Cited

U.S. PATENT DOCUMENTS

| | | | | |
|---|---|---|---|---|
| 8,823,633 | B2 * | 9/2014 | Ogi | G09G 3/3426 349/65 |
| 8,933,872 | B2 | 1/2015 | Asano et al. | |
| 9,747,840 | B2 | 8/2017 | Bi et al. | |
| 9,947,275 | B1 | 4/2018 | Ramanath et al. | |
| 10,332,432 | B2 * | 6/2019 | An | G09G 3/2092 |
| 10,403,212 | B2 * | 9/2019 | Chen | G09G 3/3291 |
| 11,308,916 | B2 | 4/2022 | Otoi | |
| 11,348,554 | B1 | 5/2022 | Tang et al. | |
| 11,551,639 | B2 * | 1/2023 | Choi | G09G 5/10 |
| 12,014,682 | B2 | 6/2024 | Kim et al. | |
| 12,272,306 | B2 * | 4/2025 | Wen | G09G 3/3233 |
| 2005/0253825 | A1 * | 11/2005 | Kawamura | G09G 3/22 348/E5.119 |
| 2011/0249039 | A1 | 10/2011 | Ogi et al. | |
| 2013/0278866 | A1 | 10/2013 | Tsumura et al. | |
| 2015/0123955 | A1 * | 5/2015 | Bi | G09G 3/3258 345/694 |
| 2015/0310795 | A1 | 10/2015 | Pantfoerder | |
| 2016/0314760 | A1 * | 10/2016 | Jangda | G09G 3/3208 |
| 2020/0334880 | A1 * | 10/2020 | Baran | G06T 5/92 |
| 2021/0225324 | A1 * | 7/2021 | Furihata | G09G 3/3233 |
| 2021/0241719 | A1 * | 8/2021 | Choi | H04N 23/57 |
| 2023/0144029 | A1 * | 5/2023 | Lee | G09G 5/10 345/77 |

OTHER PUBLICATIONS

Kim et al., “Peripheral dimming: A new low-power technology for OLED display based on gaze tracking,” IEEE Access, Nov. 17, 2020, 8:209064-209073.
Office Action in Korean Appln. No. 10-2025-7011916, mailed on Oct. 22, 2025, 23 pages (with English translation).
International Preliminary Report on Patentability in International Appln. No. PCT/US2022/053848, mailed on Jul. 3, 2025, 12 pages.

* cited by examiner

VARIABLE BRIGHTNESS DIMMING OF DISPLAY PERIPHERALS

CROSS-REFERENCE TO RELATED APPLICATION

This patent application is a continuation (and claims the benefit of priority under 35 USC 120) of U.S. patent application Ser. No. 18/286,028, filed Oct. 6, 2023, which is a National Stage Application under 35 U.S.C. § 371 and claims the benefit of International Application No. PCT/US2022/053848, filed Dec. 22, 2022, the disclosures of which are incorporated herein by reference.

TECHNICAL FIELD

This document generally relates to display devices.

BACKGROUND

Electronic devices can include display devices on which visual images are shown. To enhance user experience for outdoor applications, display brightness can be automatically or manually increased for improved readability. Increasing display brightness generally results in high power consumption.

SUMMARY

This document describes techniques, methods, systems, and other mechanisms for providing a display device with variable brightness dimming of display peripherals. Peripheral regions of a display device can be dimmed to luminance levels that are dimmer than a center region of the display device, for the same programmed pixel color. The amount of dimming at the peripheral regions can be automatically adjusted by device processes based on display brightness, power saving modes, and/or ambient lighting conditions. For example, at higher display brightness levels, a difference between luminance at the center region and luminance at the peripheral regions may be greater than the difference at lower display brightness levels.

Varying an amount that display peripherals are dimmed as a function of display brightness can reduce power consumption of display devices, while maintaining image clarity and readability in high brightness conditions. The disclosed techniques can be used to dynamically adjust the peripheral luminance profile and achieve high brightness with greater power efficiency. Greater overall display brightness can be achieved without increasing the supplied current, or by increasing the supplied current less than would otherwise be the case if there were no peripheral dimming. As an example, a display at uniform brightness may achieve 1200 nits of luminance at 650 milliamps (mA). When peripheral portions of the display are dimmed relative to the center of the display, the display can achieve 1400 nits of luminance at the same current of 650 mA. Therefore, peripheral dimming can be implemented to increase overall display brightness while reducing the increase in power consumption and reducing the risk of violating power management limits.

In some examples, the brightness of undimmed pixels (generally located centrally in the display) can be achieved without increasing the supplied current, or by increasing the supplied current less than would be the case if there were no peripheral dimming. Therefore, peripheral dimming can be implemented to increase display brightness in the regions of the display that are important visually, while reducing the increase in power consumption.

The disclosed techniques can be used to reduce power consumption while maintaining or enhancing brightness levels experienced by a user. Users typically focus on content near the center of the display. Therefore, dimming pixels around the periphery of the display is likely imperceptible to the user. Reducing luminance of peripheral pixels results in reduced power consumption. Greater power savings is achieved at higher display brightness settings, while lesser power savings is achieved at lower display brightness settings. The display is typically brighter in daytime outdoor environments. Thus, higher amounts of power savings can generally be achieved in those brighter, outdoor, environments.

Additionally, in brighter environments, the human eye is less sensitive to small spatial changes in luminance. Thus, dimming pixels at the peripheral of the display device is less noticeable in bright ambient environments than when the device is used in normal brightness environments. Due to the reduced sensitivity, peripheral pixels can be dimmed by a greater amount in brighter environments, while reducing visual perception of a non-uniform display brightness.

In some examples, the power saved by dimming the peripheral pixels can be used to increase brightness of the center pixels. In some examples, the power saved by dimming the peripheral pixels can result in reduced display power consumption. In some examples, the amount of peripheral dimming can be gradually increased over time as display brightness increases such that the changes in dimming may be imperceptible to a user.

As additional description to the embodiments described below, the present disclosure describes the following embodiments.

Embodiment 1 is a method for presenting display content on a display of a computing system, the method comprising: identifying that a current display brightness setting of the computing system has a first value that represents a first level of display brightness; selecting, by the computing system and from a collection of luminance profiles that are each configured to reduce brightness of the display content in different manners, a first luminance profile based on the current display brightness setting having the first value, the first luminance profile specifying a first amount of brightness reduction to a peripheral portion of the display content and a first gradient of brightness reduction between the peripheral portion of the display content and a center portion of the display content; applying the first luminance profile to the display content, to modify the display content by reducing a brightness of the peripheral portion of the display content by the first amount of brightness reduction and reducing a brightness of the display content between the peripheral portion of the display content and the center portion of the display content according to the first gradient of brightness reduction; and presenting the display content on the display, after the display content has been modified by applying the first luminance profile to the display content, wherein the computing system is configured to select a second luminance profile from the collection of luminance profiles and apply the second luminance profile to the display content before presenting the display content, based on the current display brightness setting having a second value that represents a second level of display brightness that is greater than the first level of display brightness.

Embodiment 2 is the method of embodiment 1, wherein reducing the brightness of the peripheral portion of the display content includes reducing a brightness level of multiple pixels in each frame of multiple frames of the display content, while retaining image content represented by the multiple pixels.

Embodiment 3 is the method of any one of the preceding embodiments, wherein: the second luminance profile specifies a second amount of brightness reduction to the peripheral portion of the display content and a second gradient of brightness reduction for the portion of the display content between the peripheral portion of the display content and the center portion of the display content; and the second amount of brightness reduction is greater than the first amount of brightness reduction.

Embodiment 4 is the method of embodiment 3, wherein the first luminance profile includes a first image mask that specifies a plurality of first levels of dimming, each first level of dimming associated with a respective portion of the first image mask; and the second luminance profile includes a second image mask that specifies a plurality of second levels of dimming, each second level of dimming associated with a respective portion of the second image mask.

Embodiment 5 is the method of embodiment 3, wherein the first luminance profile includes a first function that specifies how different portions of the display content are to be dimmed; and the second luminance profile includes a second function that specifies how different portions of the display content are to be dimmed.

Embodiment 6 is the method of any one of the preceding embodiments, wherein the first gradient of brightness reduction extends, with increasing levels of brightness reduction, away from the center portion of the display content toward the peripheral portion of the display content; and the second gradient of brightness reduction extends, with increasing levels of brightness reduction, away from the center portion of the display content toward the peripheral portion of the display content.

Embodiment 7 is the method of any one of the preceding embodiments, comprising identifying that the current display brightness setting of the computing system has a third value that represents a third level of display brightness that is lower than the first level of display brightness and lower than the second level of display brightness; presenting the display content on the display, without having applied any luminance profile from the collection of luminance profiles to the display content, based on the current display setting having the third value that is lower than the first level of display brightness and lower than the second level of display brightness.

Embodiment 8 is the method of any one of the preceding embodiments, wherein the peripheral portion of the display content surrounds and excludes the center portion of the display content.

Embodiment 9 is the method of embodiment 8, wherein the first luminance profile specifies greater brightness reduction to the peripheral portion of the display content than to the center portion of the display content; and the second luminance profile specifies greater brightness reduction to the peripheral portion of the display content than to the center portion of the display content.

Embodiment 10 is the method of any one of the preceding embodiments, wherein: the first amount of brightness reduction specified by the first luminance profile is greater in absolute and relative amounts of brightness reduction than the second amount of brightness reduction specified by the second luminance profile.

Embodiment 11 is the method of any one of the preceding embodiments, comprising: receiving, by the computing system, user input that interacts with the display to change the current display brightness setting from the first value to the second value.

Embodiment 12 is the method of embodiment 11, wherein the user input that changes the current display brightness setting from the first value to the second value includes user contact with the display that drags an element of a display brightness slider from a first location to a second location.

Embodiment 13 is the method of any one of the preceding embodiments, comprising: receiving, by the computing system, an indication that an amount of light sensed by a light sensor of the computing system has increased; and modifying, by the computing system, the current display brightness setting from the first level to the second level as a result of having received the indication that the amount of light sensed by the light sensor has increased.

Embodiment 14 is the method of any one of the preceding embodiments, wherein one or more processors of the computing system perform the applying of the first luminance profile to the display content.

Embodiment 15 is the method of embodiment 14, wherein presenting the display content on the display includes the one or more processors of the computing system device sending the display content to a display driver integrated circuit of the display for presentation.

Embodiment 16 is a computing system comprising: a display; one or more processors; and one or more computer-readable devices including instructions that, when executed by the one or more processors, cause the computing system to perform the method of any one of embodiments 1 to 15.

Embodiment 17 is a computing system comprising a display configured to present display content; one or more processors; and one or more computer-readable devices including: a collection of luminance profiles that are each configured to reduce brightness of the display content in different manners, at least one of the luminance profiles specifying a gradient of brightness reduction for a portion of the display content between a center portion of the display content and a peripheral portion of the display content with a greater brightness reduction at the peripheral portion of the display content than at the center portion of the display content; and instructions that, when executed by the one or more processors, are configured to select a selected luminance profile from the collection of luminance profiles based on a current display brightness setting of the computing system, and apply the selected luminance profile to the display content before presentation of the display content by the display.

Embodiment 18 is a method for presenting display content, the method comprising: receiving a first frame of display content for presentation on a display device of a computing device; identifying that a current display brightness setting of the computing device has a first value that represents a first level of display brightness; modifying the first frame of display content to dim a brightness of a peripheral portion of the first frame of display content by a first amount, based on the current display brightness setting having the first value, wherein the peripheral portion of the first frame of display content is configured for presentation by a peripheral portion of the display device; presenting the first frame of display content on the display device, after the first frame of display content has been modified to dim the brightness of the peripheral portion of the first frame by the first amount; receiving a second frame of display content for presentation on the display device; identifying that the current display brightness setting has a second value that represents a second level of display brightness that is greater than the first level of display brightness; modifying the second frame of display content to dim a brightness of a peripheral portion of the second frame of display content by a second amount that is greater than the first amount, based on the current display brightness setting having the second value, wherein the peripheral portion of the second frame of display content is configured for presentation by the peripheral portion of the display device such that the peripheral portion of the second frame corresponds to the peripheral portion of the first frame; and presenting the second frame of display content on the display device, after the second frame of display content has been modified to dim the brightness of the peripheral portion of the second frame by the second amount that is greater than the first amount.

Embodiment 19 is the method of embodiment 18, wherein: dimming the brightness of the peripheral portion of the first frame by the first amount includes reducing a brightness level of multiple first pixels within the peripheral portion of the first frame while retaining image content represented by the multiple first pixels; and dimming the brightness of the peripheral portion of the second frame by the second amount includes reducing a brightness level of multiple second pixels within the peripheral portion of the second frame while retaining image content represented by the second frame.

Embodiment 20 is the method of any one of embodiments 18 or 19, wherein: modifying the first frame to dim the brightness of the peripheral portion of the first frame by the first amount includes the computing device: selecting a first luminance profile from a collection of luminance profiles, based on the current display brightness setting having the first value; and applying the first luminance profile to the first frame; and modifying the second frame to dim the brightness of the peripheral portion of the second frame by the second amount includes the computing device: selecting a second luminance profile from the collection of luminance profiles, based on the current display brightness setting having the second value; and applying the second luminance profile to the second frame, wherein the second luminance profile specifies an amount of peripheral dimming that is greater than an amount of peripheral dimming specified by the first luminance profile.

Embodiment 21 is the method of embodiment 20, wherein the first luminance profile includes a first image mask that specifies a plurality of first levels of dimming, each first level of dimming associated with a respective portion of the first image mask; and the second luminance profile includes a second image mask that specifies a plurality of second levels of dimming, each second level of dimming associated with a respective portion of the second image mask.

Embodiment 22 is the method of embodiment 21, wherein the first image mask specifies a first gradient of first levels of dimming that extends, with increasing levels of dimming, away from a center of the first image mask towards a peripheral edge of the first image mask; and the second image mask specifies a second gradient of second levels of dimming that extends, with increasing levels of dimming, away from a center of the second image mask towards a peripheral edge of the second image mask.

Embodiment 23 is the method of embodiment 20, wherein the first luminance profile includes a first function that specifies how different portions of an image frame are to be dimmed; and the second luminance profile includes a second function that specifies how different portions of an image frame are to be dimmed.

Embodiment 24 is the method of any one of embodiments 20 to 23, comprising: receiving a third frame of display content for presentation on the display device; identifying that the current display brightness setting of the computing device has a third value that represents a third level of display brightness that is lower than the first level of display brightness and that is lower than the second level of display brightness; and presenting the third frame of display content on the display device, without having applied any luminance profile from the collection of luminance profiles, or after having applied to the third frame a third luminance profile from the collection of luminance profiles that represents a least amount of dimming from among the luminance profiles in the collection of luminance profiles.

Embodiment 25 is the method of any one of embodiments 18 to 24, wherein: the peripheral portion of the display device surrounds and excludes a center portion of the display device; the peripheral portion of the first frame surrounds and excludes a center portion of the first frame; and the peripheral portion of the second frame surrounds and excludes a center portion of the second frame.

Embodiment 26 is the method of embodiment 25, wherein: the first amount by which the peripheral portion of first frame is dimmed represents an amount that the peripheral portion of the first frame is dimmed more than an amount that the center portion of the first frame is dimmed; and the second amount by which the peripheral portion of the second frame is dimmed represents an amount that the peripheral portion of the second frame is dimmed more than an amount that the center portion of the second frame is dimmed.

Embodiment 27 is the method of embodiment 25, wherein the first amount by which the peripheral portion of first frame is dimmed represents a first proportion between an amount that the peripheral portion of the first frame is dimmed with respect to an amount that the center portion of the first frame is dimmed; and the second amount by which the brightness of the second frame is dimmed represents a second proportion between an amount that the peripheral portion of the second frame is dimmed with respect to an amount that the center portion of the second frame is dimmed.

Embodiment 28 is the method of any one of embodiments 25 to 27, wherein: the first amount that the peripheral portion of the first frame of content is dimmed is greater than an amount that the center portion of the first frame is dimmed; and the second amount that the peripheral portion of the second frame of content is dimmed is greater than an amount that the center portion of the second frame is dimmed.

Embodiment 29 is the method of any one of embodiments 18 to 28, wherein: the second amount that the peripheral portion of the second frame of content is dimmed is greater in absolute and relative amounts of brightness reduction than the first amount that the peripheral portion of the first frame of content is dimmed.

Embodiment 30 is the method of any one of embodiments 25 to 29, comprising: receiving a third frame of display content for presentation on the display device; identifying that the current display brightness setting of the computing device has a third value that represents a third level of display brightness that is lower than the first level of display brightness and that is lower than the second level of display brightness; and presenting the third frame of display content on the display device, after the third frame of display content has been modified to dim the brightness of the peripheral portion of the third frame by a third amount that is less than the first amount and that is less than the second amount.

Embodiment 31 is the method of any one of embodiments 18 to 30, comprising: receiving, by the computing device, user input that interacts with the display device to change the current display brightness setting from the first value to the second value.

Embodiment 32 is the method of embodiment 31, wherein: the user input that changes the current display brightness setting from the first value to the second value includes user contact with the display device that drags an element of a display brightness slider from a first location to a second location.

Embodiment 33 is the method of any one of the preceding embodiments, comprising: receiving, by the computing device, an indication that an amount of light sensed by a light sensor of the computing device has decreased; and modifying, by the computing device, the current display brightness setting from the first level to the second level as a result of having received the indication that the amount of light sensed by the light sensor has decreased.

Embodiment 34 is the method of any one of the preceding embodiments, wherein: modifying the first frame to dim the peripheral portion of the first frame is performed by one or more processors of the computing device; and modifying the second frame to dim the peripheral portion of the second frame is performed by the one or more processors of the computing device.

Embodiment 35 is the method of any one of the preceding embodiments, wherein: presenting the first frame includes the one or more processors of the computing device sending the first frame to a display driver integrated circuit of the display device for presentation; and presenting the second frame includes the one or more processors of the computing device sending the second frame to the display driver integrated circuit of the display device for presentation.

Embodiment 36 is a computing device, comprising: a display device; one or more processors; and one or more computer-readable devices including instructions that, when executed by the one or more processors, cause the computing device to perform the method of any one of embodiments 18 to 35.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes mechanisms for providing a display device with variable brightness dimming of display peripherals. For example, as display brightness increases, an amount of dimming applied to display peripherals increases. The luminance profile applied to images presented on the display can be dynamically adjusted based on a display brightness setting, ambient lighting conditions, and power saving settings.

A computing device may apply a luminance profile to frames of image content that are presented by a display device. Characteristics of the luminance profile can change gradually over time (or a different luminance profile can be applied) to achieve seamless user experience, while reducing power consumption of the display device. The luminance profile can be adjusted across the whole display area based on one or more display brightness settings in order to enrich the user's viewing area, while reducing the power consumption at the periphery of the display device. The luminance profile can be applied across a horizontal dimension of the display, a vertical dimension, a diagonal dimension, or any combination of these.

The following discussion of the figures provides additional detail regarding such mechanisms to variably dim brightness of display peripherals. The discussion of FIGS. 1 and 2A-B provide an overview of operation of a display device and components therein, with FIGS. 3 to 7 describing how such components can be operated to vary peripheral dimming in the presence of strong ambient light.

Figure 1:
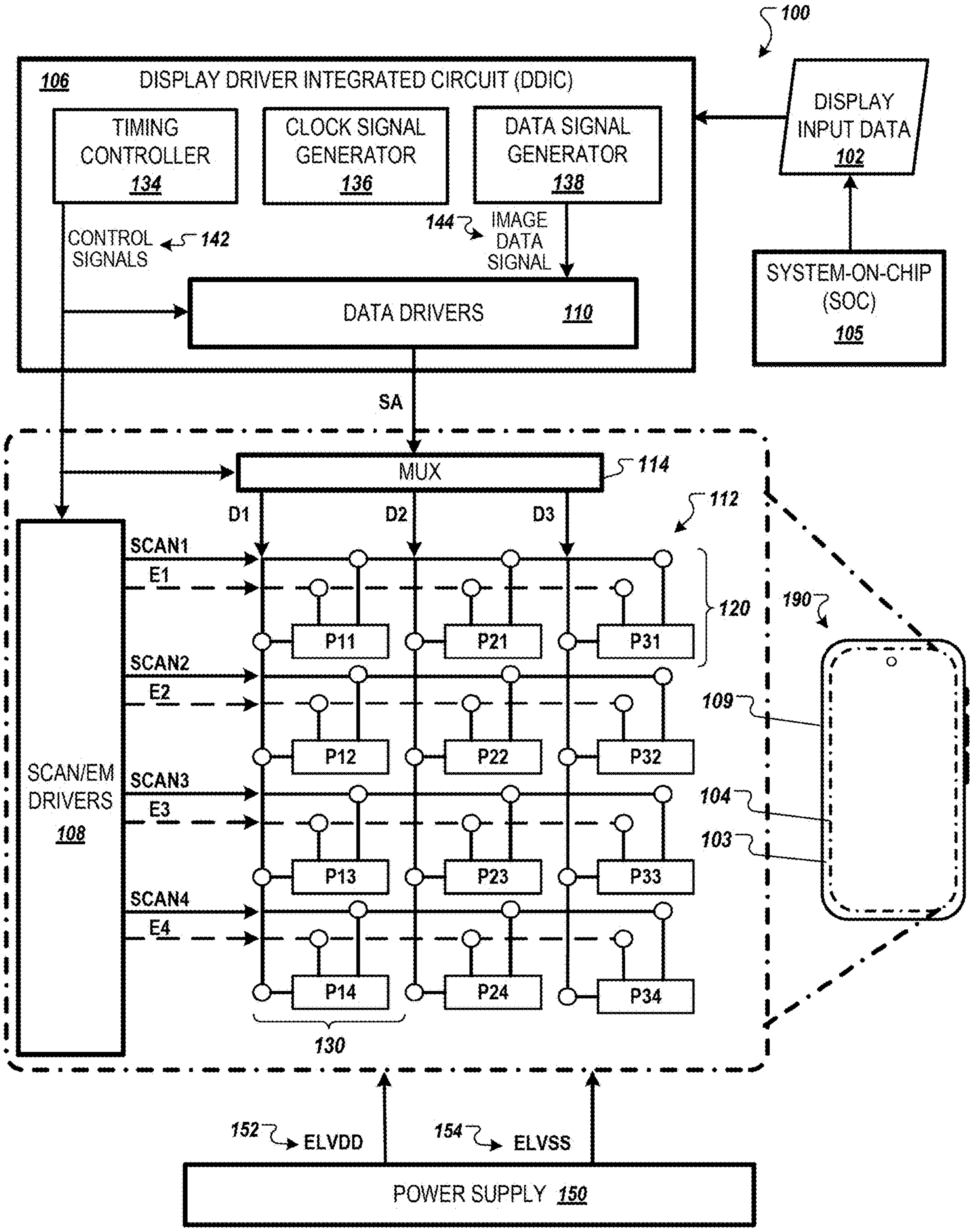
FIG. 1 shows a diagram of an example display system of an electronic device.
Figure 2A:
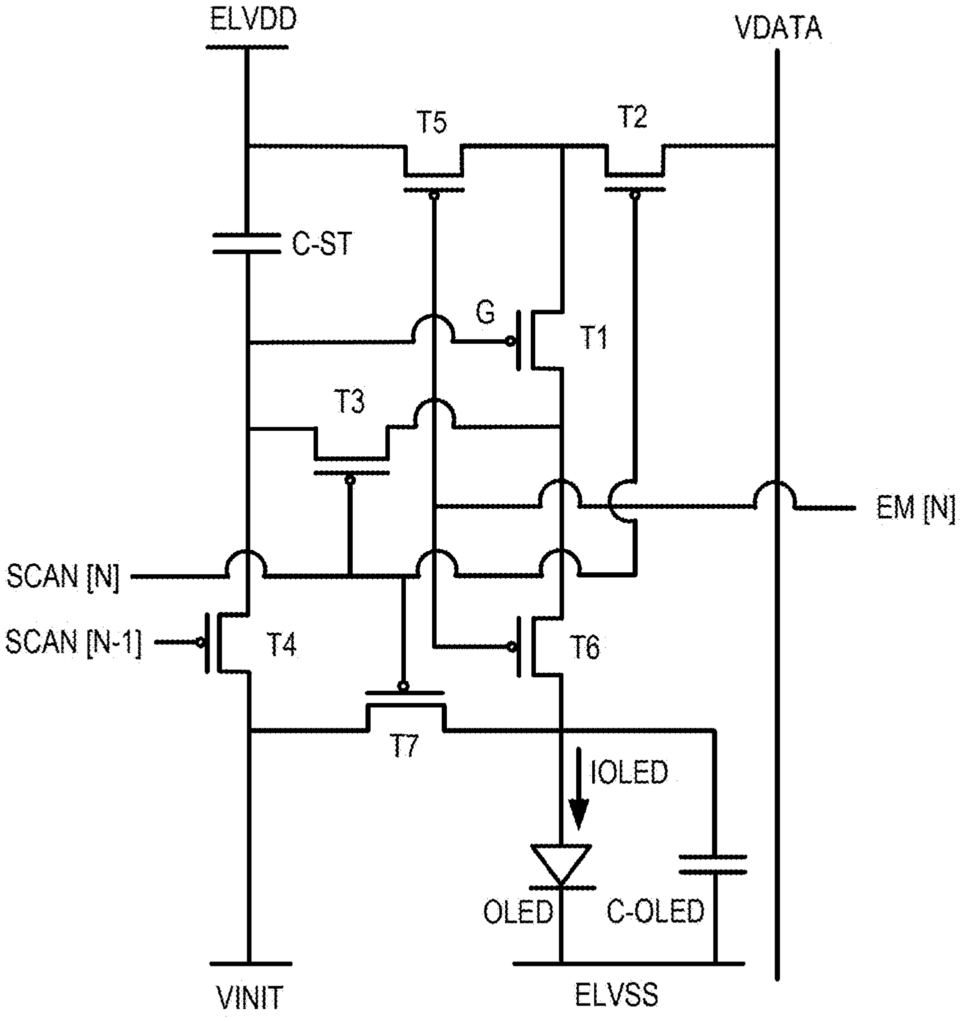
FIGS. 2A-B show a diagram of a pixel circuit of a display device and a corresponding timing diagram.
Figure 2B:
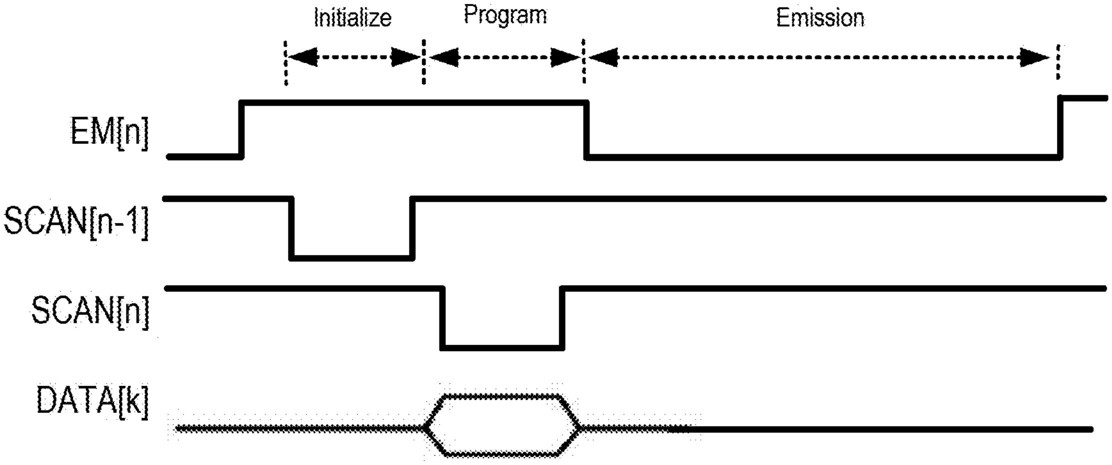

FIG. 1 is a diagram of an example display system 100 of computing device 190. The device 190 includes a display panel 104 housed in a chassis 109. A region of the device 190 between the edge of the panel 104 and the edge of the chassis is a bezel region 103.

The display panel 104 is an OLED display panel 104 that includes an array 112 of light emitting pixels. Each light emitting pixel includes an OLED. The OLED display is driven by drivers, including SCAN/EM drivers 108 and data drivers 110. The SCAN/EM drivers 108 can be integrated, i.e., stacked, row line drivers. In general, the data drivers 110 provide data signals (e.g., voltage data (VDATA)) to the data lines (e.g., D1-D3), the SCAN/EM Drivers 108 provides a SCAN signal to a selected one of the scan lines (e.g., SCAN1) move the data signals from the data lines to the pixels in the selected scan line, and the SCAN/EM Drivers 108 provide an EMISSION signal to a selected one of the emission lines (e.g., E1) to light the OLEDs in the selected row according to image data specified by the data signals. Although FIG. 1 illustrates the display system 100 having the SCAN/EM drivers 108 on a single side of the display, the SCAN/EM drivers 108 can be placed on both left and right sides of the display to improve driving performance (e.g., increasing speed by having SCAN drivers on the left side of the display and the EM drivers on the right side of the display).

The pixel array 112 includes a plurality of light emitting pixels, for example, the pixels P11 through P34. A pixel is a small element of a display that can change color based on the image data supplied to the pixel. Each pixel includes an OLED and circuitry to address the OLED with a data value, store the data value, and drive the OLED at an intensity based on the data value (e.g., the components shown in FIG. 2A). Each pixel within the pixel array 112 can be addressed individually to produce various intensities of a color produced by the pixel. Each pixel maintains a mostly steady luminance throughout a frame time, displaying light corresponding to the supplied image data.

Luminance is the amount of light emitted by the surface area of a light source such as a pixel or a display. Display luminance is the luminous intensity coming from the surface of the display. Luminance can be measured in units such as candelas per square meter (cd/$m^2$), which are also referred to as "nits."

A frame time, or frame period, is an amount of time between a start of a frame and a start of a next frame. The frame time can be the inverse of a frame rate of a display system. For example, a frame rate of 60 frames per second (fps) corresponds to a frame time of one-sixtieth of a second, or 0.0167 seconds.

The pixel array 112 extends in a plane and includes rows and columns. Each row extends horizontally across the pixel array 112. For example, the first row 120 of the pixel array 112 includes pixels P11, P21, and P31. Each column extends vertically down the pixel array 112. For example, the first column 130 of the pixel array 112 includes pixels P11, P12, P13, and P14. Only a few pixels are shown in FIG. 1 for simplicity. In practice, there may be thousands or millions of pixels in the pixel array 112. Increasing the numbers of pixels in a display that remains the same size results in a higher image resolution.

The display system 100 includes a display driver integration circuit (DDIC) 106 that receives display input data 102. The display input data 102 can include color values for each pixel of the pixel array 112. The color value for a pixel corresponds with a color to be emitted by the pixel. In some examples, the display input data 102 can include brightness values for each pixel of the pixel array 112. The brightness value for a pixel corresponds with a brightness of the light to be emitted by the pixel.

In some examples, the display input data 102 includes a pixel value that incorporates both color data and brightness data. The RGB values of typical digital images do not directly correspond to the physical light intensities, but are rather compressed by a gamma correction function. This transformation better utilizes the limited number of bits in the encoded image by choosing a gamma value that matches the non-linear human perception of luminance. For example, the display input data 102 can include a gamma corrected pixel value for each subpixel of each pixel of the array 112. Addressing a pixel using the gamma corrected pixel value causes the pixel to emit light at the color and brightness specified by the gamma corrected pixel value.

In some examples, the DDIC 106 receives the display input data 102 from a system-on-chip (SoC) 105. The SoC 105 is a microchip with all the necessary electronic circuits and parts for a given system, such as a smartphone or wearable computer, on a single integrated circuit (IC). The SoC 105 is an integrated circuit that includes multiple components on a single chip. The SoC 105 can include, for example, a processor, a memory 306, and input/output (I/O) ports. The SoC 105 can be implemented on a single substrate, such as silicon. The SoC 105 can process digital signals, analog signals, and mixed signals.

The DDIC 106 can be, for example, a semiconductor integrated circuit or a state machine. The DDIC 106 generates signals with suitable voltage, current, timing, and demultiplexing to cause a display panel 104 to show images according to display input data 102. In some examples, the DDIC 106 can be a microcontroller and may incorporate RAM, Flash memory, EEPROM, ROM, etc.

The DDIC 106 drives the pixel array 112 to emit light according to the display input data 102. For example, the data signal generator 138 of the DDIC 106 generates image data signals 144 from the display input data 102 and provides the image data signals 144 to the data drivers 110. The image data signals 144 can include voltages for each subpixel of the pixel array 112 to drive the subpixels to emit light at a color and brightness specified by the display input data 102.

The DDIC 106 includes a timing controller 134, a clock signal generator 136, and a data signal generator 138. The DDIC 106 generates control signals 142. The control signals 142 can include, for example, signals that control a display frame start time and a display frame stop time of each frame presented by the display panel 104, where a frame represents a single image in a sequence of images that are presented by the display panel 104. In examples in which each frame presented by the display panel includes multiple emission cycles, the control signals 142 or other signals not illustrated in FIG. 1 can control a display emission start time and a display emission stop time of each emission cycle of the display panel 104.

In some examples, the SCAN/EM drivers 108, the data drivers 110, or both, can be integrated with the DDIC 106. The SCAN/EM drivers supply SCAN and EM signals to rows of the pixel array 112. For example, the SCAN/EM drivers 108 supply scan signals via scan lines S1 to S4, and EM signals via EM lines E1 to E4, to the rows of pixels, with each row of pixels in the pixel array 112 being addressed by a scan line and a corresponding emission line. For example, the first row 120 of the pixel array 112 is addressed by scan line SCAN1 and emission line E1.

The data drivers 110 supply signals to columns of the pixel array 112. For example, based on the image data signal 144 from the data signal generator 138, the data drivers 110 output data values via source amp output signal lines SAN (e.g., a set of source amp signal lines SA1, SA2, and SA3) to a set of multiplexers 114 in the panel 104. The set of multiplexers 114 in the panel 104 receive data values from a corresponding set of source amp output signal lines SAN, and route the received data values among a greater number of data lines. For example, FIG. 1 illustrates a single MUX 114 that is configured to receive a stream of data values from the data driver 110 via the source output signal line SA1, and distribute the stream of data values one at a time among the data signal lines D1-3. In practice there would likely be multiple MUXs, each being fed with data values from the data drivers 110 via a corresponding source control signal line. Operations of the multiplexers 114 are described in greater detail with reference to FIG. 3A.

The data drivers 110 supply data voltages via the data lines D1 to D3. In some examples, each of the data lines D1 to D3 represent multiple data lines. For example, the pixel P11 can include three subpixels (e.g., P11R for a red subpixel, P11G for a green subpixel, and P11B for a blue subpixel), and the data line D1 can represent three corresponding data lines, each addressing a corresponding subpixel of pixel P11.

The control signals 142 can be used to drive the SCAN/EM drivers 108 and the data drivers 110. Thus, the DDIC 106 controls the timing of the scan signals, EM signals, and data signals.

The display system 100 includes a power supply 150. The power supply 150 provides a first supply voltage ELVDD and a second supply voltage ELVSS, both of which are provided to each pixel in the pixel array 112. In some examples, the power supply 150 can be integrated with the DDIC 106.

Each pixel in the pixel array 112 is addressable by a horizontal scan line, a horizontal EM line, and a vertical data line. For example, the pixel P11 is addressable by the data line D1, the scan line S1, and the EM line E1. In another example, the pixel P23 is addressable by the data line D2, the scan line S3, and the EM line E3.

The scan lines are addressed sequentially for each frame. A scan direction determines an order in which the scan lines are addressed (e.g., a direction in which rows of pixels receive data values and then light up at intensities based on the received data values). In the display system 100, the scan direction is from a top of the pixel array 112 to a bottom of the pixel array 112. For example, the scan line S1 is addressed first, followed by the scan line S2, then S3, etc. In some implementations, all rows of pixels are programmed with data values using SCAN signals (one row at a time), before the display device activates all rows of pixels at intensities based on the programmed data values. In some implementations, a display device may activate rows of pixels while other rows of pixels are still being programmed, such that there is a gap of a few rows between a row currently receiving a SCAN signal and a row of pixels that is activated and begins emitting light.

While FIG. 1 illustrates that each row is addressed by a single scan line, each row may be addressed by multiple scan lines (e.g., nSCAN and pSCAN). Although FIG. 1 illustrates example components of an OLED display, the described techniques may be applied to other flat panel display technologies that include an array of pixels. The techniques can be applied to curved displays, flexible displays, foldable displays, and rollable displays. For example, the technology may be applied to light emitting diode displays (LED), liquid crystal displays (LCD), and plasma display panels (PDP). The technology can also be applied to projectors (e.g., digital light processing projectors) to reduce power consumption and to reduce the amount of heat absorbed and dissipated by the projector.

FIG. 2A shows a diagram of a pixel circuit of a display device, which pixel circuit includes an LED and corresponding drive circuitry for the pixel circuit. FIG. 2A may illustrate a more detailed view of a single pixel from the array of pixels shown in FIG. 1. While this disclosure sometimes refers to the components shown in FIG. 2A as a “pixel circuit”, this disclosure may also refer to such components as simply a “pixel.” Further, the pixel shown in FIG. 2A can represent a sub-pixel.

The pixel circuit may be an active matrix OLED (AMOLED) pixel circuit. The pixel circuit receives an emission signal (EM) on an emission line, SCAN signals on scan signal lines, and a data voltage (VDATA) signal on a data line. The pixel circuit 200 receives a first supply voltage ELVDD on a first voltage supply line, a second supply voltage ELVSS on a second voltage supply line, and an initial reference voltage VINIT on an initial voltage supply line.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor CST and transistors T2 through T7. The operation of the pixel is defined by states of the control signals SCAN, EM, and VDATA. An amount/level of the OLED current (IOLED) is set by a voltage present at a gate terminal of the driving transistor T1, referred to herein as the “G” node.

The driving transistor T1 has a threshold voltage VTH between the gate terminal of the driving transistor T1 and a source terminal of the driving transistor T1. If the voltage between the gate terminal and the source terminal is above the threshold voltage VTH, the driving transistor T1 creates a conducting path from the source terminal to the drain terminal. An amount of current IOLED that flows through the conducting path through the driving transistor T1 corresponds to an amount that the voltage between the gate terminal and the source terminal is above the threshold voltage VTH.

FIG. 2B shows a timing diagram of the control signals provided to and received by the pixel shown in FIG. 2A. These control signals repeatedly transition during operation of the display system 100 between an initialization stage, a programming stage, and an emission stage.

At an end of an emission stage, the EM signal transitions to an off state (e.g., by changing from a low state to a high state). This transition turns off transistors T5 and T6, which interrupts current being provided from ELVDD to the OLED, therefore stopping light emission by the OLED. Since the EM signal may be provided to an entire line of pixels, this transition can turn off all pixels in the line of pixels.

During the initialization stage, the SCAN[n−1] signal turns to an on state (e.g., by changing from a high state to a low state), which turns on transistor T4 for a period of time and initializes the G node to the initialization voltage VINIT. Since the SCAN[n−1] signal may be provided to an entire line of pixels, this initialization stage can erase the data values that were previously stored at each pixel in the line of pixels. The SCAN[n−1] signal may be the SCAN[n] signal provided to a preceding row by a state machine of the SCAN/EM drivers 108.

During the programming stage, the SCAN[n] signal turns to an on state (e.g., by going low), which turns on transistors T2, T3, and T7 for a period of time. This causes the voltage value at the voltage data VDATA line to pass through transistors T2, T1, and T3 to the G node, setting the G node to a value based on the VDATA line (e.g., the voltage at VDATA minus an effect of transistor threshold voltages). Since the SCAN signal may be provided to an entire line of pixels, this programming stage can cause each pixel in the line of pixels to move data voltage values from each pixel’s respective data line to the G node of the respective pixel.

During the emission stage, the EM signal turns to an on state (e.g., by going low), which turns on transistors T5 and T6. Current flows from ELVDD through transistors T5, T1, and T6 to an anode of the OLED. Since the EM signal is provided to an entire line of pixels, all pixels in the line of pixels may activate.

A current level provided to the OLED in each pixel is determined by the voltage present at the G node of the pixel (e.g., with the G node voltage level having been programmed by the voltage data VDATA line). An intensity or brightness of light emitted by the OLED directly correlates to an amount of electrical current IOLED applied to the OLED, with higher current corresponding to a greater intensity of light than a lower current. The storage capacitor CST maintains the voltage at the G node, so that the OLED continues to emit light at roughly the same level for a duration of the emission stage.

The voltage at the G node may decrease slightly during the emission stage. As such, the current IOLED applied to the OLED and the intensity of light emitted by the OLED may decrease or increase slightly during the emission stage, depending on a type of pixel circuit design (e.g., with p-channel transistors in the pixel circuit, lower voltage levels at the G node cause higher IOLED and higher intensity of OLED light).

Figure 3:
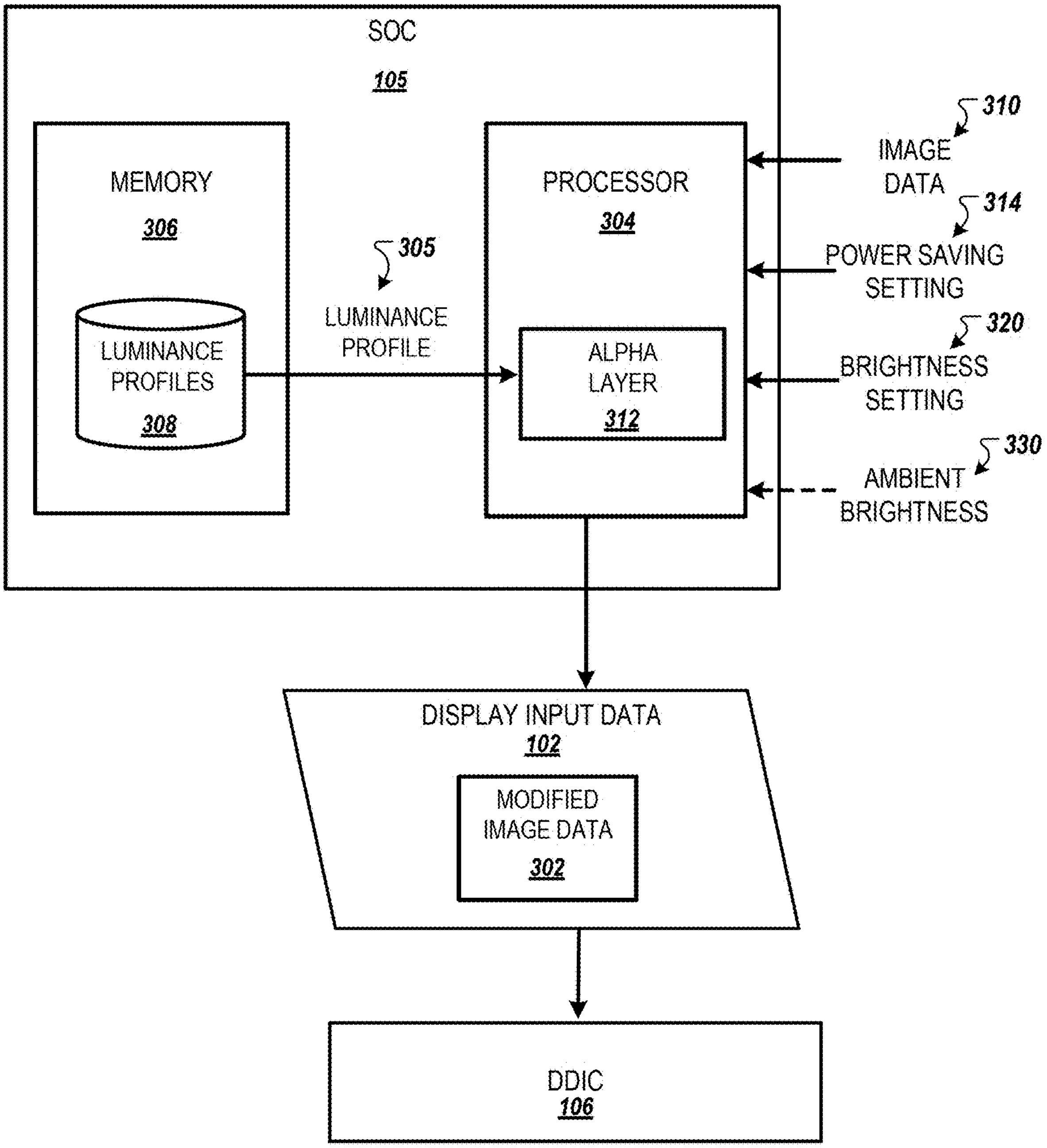
FIG. 3 shows a block diagram of a system for varying brightness dimming of display peripherals.

FIG. 3 shows a block diagram of a system 300 for varying brightness dimming of display peripherals. The system 300 includes the SoC 105 and the DDIC 106 of the display system 100. The SoC 105 includes a memory 306 and a processor 304.

The processor 304 can be, for example, a Graphical Processing Unit (GPU). The processor 304 can include, for example, a bus interface, a power management unit, a video processing unit, a graphics memory controller, a display interface, or any combination of these. The processor 304 can include a digital signal processor (DSP). The DSP can perform signal processing operations such as data collection and data processing.

When generating and displaying images on the display panel 104 of the device 190, the processor 304 can generate visual content data, such as a frame of a video. The visual content data may be for a video sequence that is pre-rendered, e.g., for a film. The visual content data may be for a video sequence that is dynamically generated, e.g., for a video game or for user navigation through various operating system screens and menus. In some examples, the visual content data can be compressed, using any appropriate method. In some examples, the visual content data can be uncompressed. The processor 304 can store the generated visual content data in the memory 306. The memory 306 may be any appropriate type of memory. For instance, the memory 306 can be a random access memory (RAM).

The SoC 105 stores, in the memory 306, a collection of luminance profiles 308. The collection of luminance profiles 308 can include multiple profiles for dimming peripherals of displayed images. Each luminance profile can include a prescribed amount of dimming for each pixel of the pixel array 112. In some examples, the luminance profiles 308 are specific to the device 190. For example, the luminance profiles 308 can be calibrated to the device 190, for example, during design and/or fabrication. In some examples, the luminance profiles 308 are common for multiple devices.

In some examples, the collection of luminance profiles 308 can be stored by an external memory that is external to the SoC 105. The external memory can be, for example, a flash storage device. The SoC 105 can read the collection of luminance profiles 308 from the external memory to the internal memory 306. The processor 304 can then read a luminance profile from the memory 306 and combine the luminance profile with image content (e.g., for video, games, user interface) as the content is sent to the DDIC 106.

In some examples, a luminance profile includes a mask of dimming values for applying to image data. The mask can be an image mask that specifies differing levels of dimming at different portions of the mask. In some examples, a first image mask specifies multiple first levels of dimming, each first level of dimming being associated with a respective portion of the first image mask. A second image mask specifies multiple second levels of dimming, each second level of dimming being associated with a respective portion of the second image mask.

In some examples, a luminance profile includes an array of dimming values, each dimming value corresponding to a pixel of the array (e.g., so that the mask has the same dimensions as image content to be presented by the display device). In some examples, a luminance profile includes dimming values only for peripheral portions of the pixel array 112. In some examples, a luminance profile includes dimming values for all portions of the pixel array 112. In some examples, a luminance profile includes a function or functions for applying to image data. For example, luminance profiles can include functions that are dependent on variables such as the display brightness setting 320. Thus, any change in display brightness setting 320 may result in a change to the applied luminance profile or a change from one luminance profile to another. Each luminance profile can be associated with one or more display brightness settings, or a range of display brightness settings. Luminance profiles are described in greater detail with respect to FIGS. 4, 5, and 6A to 6F.

The SoC 105 can receive, as input, image data 310, a brightness setting 320, a power saving setting 314, or any combination of these. The SoC 105 can optionally receive, as input, ambient brightness 330. The image data 310 can be, for example, image data for an image frame. The brightness setting 320 can be a setting of display brightness, e.g., an arbitrary number used for computation of display brightness, or a setting that specifies an amount of nits. The power saving setting 314 can indicate a power saving mode of the device 190, e.g., normal mode or a low power mode. The ambient brightness 330 can be an indication of brightness of the environment in which the device 190 is located. In some examples, the device 190 includes a light sensor configured to detect ambient brightness 330. The SoC 105 can receive an indication of an amount of light sensed by a light sensor of the device 190, and can determine the ambient brightness 330 using the indication of the amount of light sensed by the light sensor. In some examples, the SoC 105 modifies the display brightness setting 320 based on the amount of light sensed by the light sensor, for example, to increase an overall brightness of the display when in high ambient light environments.

The SoC 105 can determine, based on the brightness setting 320, the power saving setting 314, the ambient brightness 330, or any combination of these, whether or not to apply a luminance profile to the image data 310. When the SoC 105 determines to apply a luminance profile to the image data 310, the SoC 105 can select a luminance profile based on any combination of one or more of the brightness setting 320, the power saving setting 314, and the ambient brightness 330.

In some examples, the display device has a "high brightness" setting. When the display device is not in the high brightness setting, the display device may be in a "normal brightness" setting. The high brightness setting can be a setting entered by the device 190 when the ambient brightness is above a threshold ambient brightness and/or when the high brightness setting is selected by a user. The high brightness setting can be a setting in which overall display luminance is at or above a threshold luminance. The threshold luminance can be, for example, a luminance of 600 nits, 700 nits, 800 nits. In some examples, a high brightness setting is a setting in which the display brightness value (DBV) is at or above a threshold DBV. The threshold DBV can be, for example, 1600, 1800, or 2000 for a 12-bit display.

In some examples, the SoC 105 determines to apply a luminance profile to the image data 310 without regard to the brightness setting 320. For example, the SoC 105 can determine to select a luminance profile 305 from the collection of luminance profiles 308 to apply to the image data 310 when the device is in a high brightness setting and when the device is in a normal brightness setting. The SoC 105 may select a different luminance profile at the high brightness setting than at the normal brightness setting.

In some examples, the SoC 105 determines to apply a luminance profile to the image data 310 when the brightness setting 320 of the device is a high brightness setting, and determines not to apply any luminance profile when the brightness setting 320 of the device is a normal brightness setting.

In some examples, the SoC 105 applies a luminance profile to the image data 310 without regard to the power saving setting 314. For example, the SoC 105 can determine to select a luminance profile 305 from the collection of luminance profiles 308 to apply to the image data 310 when the device is in a low power mode and when the device is in a normal power mode. The low power mode can be a power saving setting 314 entered by the device 190 when the battery is at below a threshold power level and/or when the low power mode is selected by a user.

In some examples, the SoC 105 determines to apply a luminance profile to the image data 310 when the power saving setting 314 of the device is a low power mode, and determines not to apply any luminance profile when the power saving setting 314 of the device is a normal power mode.

In some examples, the SoC 105 determines to apply a luminance profile to the image data 310 when the ambient brightness 330 is at or above a threshold brightness, and determines not to apply any luminance profile when the ambient brightness 330 is below the threshold brightness.

When the SoC 105 determines to apply a luminance profile to the image data, the processor 304 selects, from the collection of luminance profiles 308, a luminance profile 305. The processor 304 can select the luminance profile 305 based on the brightness setting 320, the power saving setting 314, or both. The processor 304 can store the luminance profile 305 in the alpha layer 312 of the processor 304. The alpha layer 312 is an overlay layer of the processor 304 of the SoC 105 that can be used for image compensation.

The alpha layer 312 can be used for alpha blending. Alpha blending is a process of combining one image with a background to create the appearance of partial or full transparency. Alpha blending is a form of encoding that can be used to render pixels in separate passes or layers and then combine the resulting images into a single, final image called the composite. Alpha blending can be used in computer graphics to put rasterized foreground elements over a background. In order to combine the pixels of the images, an associated alpha value can be kept for each pixel in addition to its color. The value of the alpha channel influences the values of the color channels. In a two-dimensional image, a color combination can be stored for each pixel, which may be a combination of red, green, and blue (RGB). When alpha blending is in use, each pixel has an additional numeric value stored in its alpha channel, e.g., with a value ranging from 0 to 1. The RGB channels of a pixel can be multiplied by the alpha value to obtain an encoded value.

The processor 304 applies the luminance profile 305 to the image data 310 to generate modified image data 302. For example, the processor 304 can apply the luminance profile 305 to the image data 310 by multiplying image data values by corresponding values of the luminance profile 305 in the alpha layer 312. In some examples, the processor 304 applies the luminance profile 305 to the image data 310 by dividing image data values by corresponding values of the luminance profile 305.

The SoC 105 provides display input data 102 to the DDIC 106. The display input data 102 can include the modified image data 302 generated by applying the luminance profile 305 to the image data 310. Although FIG. 3 shows the SoC 105 generating the modified image data 302 from the image data 310, other implementations are possible. For example, in some implementations, the SoC 105 provides the luminance profile 305 and the image data 310 to the DDIC 106, and the DDIC 106 modifies the image data 310 using the luminance profile 305.

In some examples, the SoC 105 selects a new luminance profile in response to a change in brightness setting 320. The new luminance profile is stored by the processor 304 or the DDIC 106, and is applied to frames of image data until the next change in brightness setting 320 occurs. When the change in brightness setting 320 occurs, the SoC 105 again selects a new luminance profile.

Figure 4:
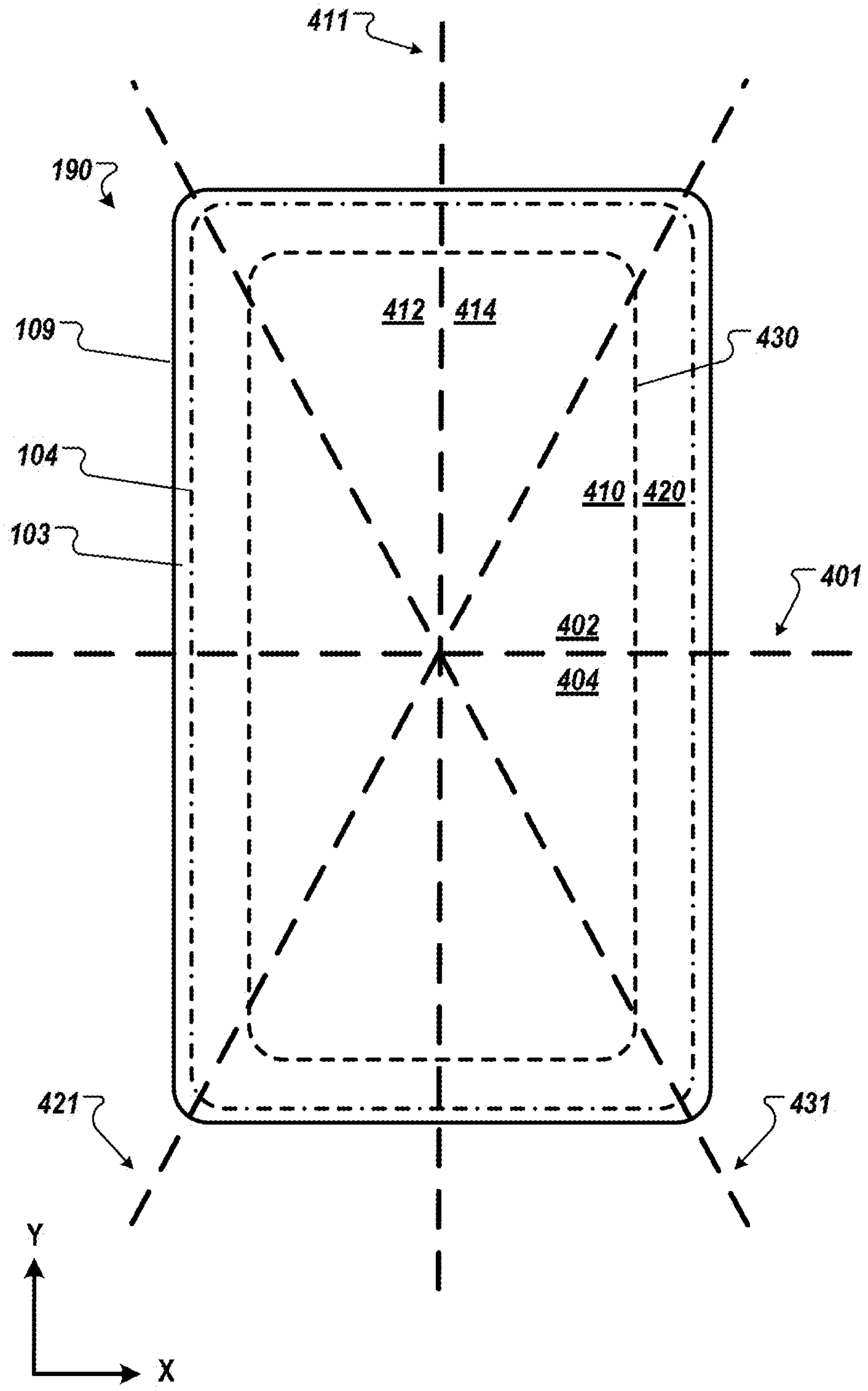
FIG. 4 shows example axes for applying luminance profiles to a display device.

FIG. 4 shows example axes for applying luminance profiles to a display device, e.g., a display device of the computing device 190. As shown in FIG. 4, the device 190 includes display panel 104 and chassis 109, with the bezel region 103 between the edge of the display panel 104 and the edge of the chassis 109.

The display panel 104 includes a center portion 410 and a peripheral portion 420. The center portion 410 and the peripheral portion 420 are defined by a boundary 430 that divides the center portion 410 and the peripheral portion 420. In some examples, the peripheral portion 420 of the display panel 104 surrounds and excludes the center portion 410. In some examples, a luminance profile includes adjusted luminance levels of only pixels in the peripheral portion 420, and does not include adjusted luminance levels of pixels in the center portion 410. Pixels within the center portion 410 can be referred to as center pixels. Pixels within the peripheral portion 420 can be referred to as peripheral pixels.

The boundary 430 can vary for different luminance profiles. For example, a first luminance profile can include a boundary that is closer to the edge of the display panel 104, resulting in a narrower peripheral portion 420. A second luminance profile can include a boundary that is closer to the center of the display panel 104, resulting in a wider peripheral portion 420.

In some examples, a position of the boundary 430 relative to the edge of the display panel 104 can vary based on display brightness settings, power saving settings, ambient light conditions, or any combination of these. For example, at a higher display brightness setting, the boundary 430 can be positioned further from the edge of the display panel 104. At a lower brightness setting, the boundary 430 can be positioned nearer to the edge of the display panel 104.

The display panel 104 has a horizontal axis 401 and a vertical axis 411. The horizontal axis 401 extends in the x-direction and divides the display panel 104 between an upper portion 402 and a lower portion 404. In some examples, the horizontal axis 401 divides the display panel 104 in half, such that the upper portion 402 and the lower portion 404 have the same area or approximately the same area.

The vertical axis 411 extends in the y-direction and divides the display panel between a left portion 412 and a right portion 414. In some examples, the vertical axis 411 divides the display panel 104 in half, such that the left portion 412 and the right portion 414 have the same area or approximately the same area.

The display panel 104 has a first diagonal axis 421 and a second diagonal axis 431. Each of the diagonal axes 421, 431, divides the display panel 104 along a diagonal x-y direction.

Dynamic luminance profiles can be applied to the display panel 104 across any direction, and can be symmetric across any axis. In some examples, a luminance profile is applied across the horizontal axis 401. For example, a pixel that is a particular distance from the horizontal axis 401 in the lower portion 404, and a pixel that is the particular distance from the horizontal axis 401 in the upper portion 402 may both have the same amount of dimness relative to a horizontally centered pixel, e.g., a pixel along the horizontal axis 401.

In some examples, a luminance profile is applied across the vertical axis 411. For example, a pixel that is a particular distance from the vertical axis 411 in the left portion 412 and a pixel that is the particular distance from the vertical axis 411 in the right portion 414 may both have the same amount of dimness relative to a vertically centered pixel, e.g., a pixel along the vertical axis 411.

In some examples, a luminance profile is applied across both the horizontal axis 401 and the vertical axis 411. In some examples, a luminance profile is applied across one or both of the diagonal axes 421, 431.

Figure 5:
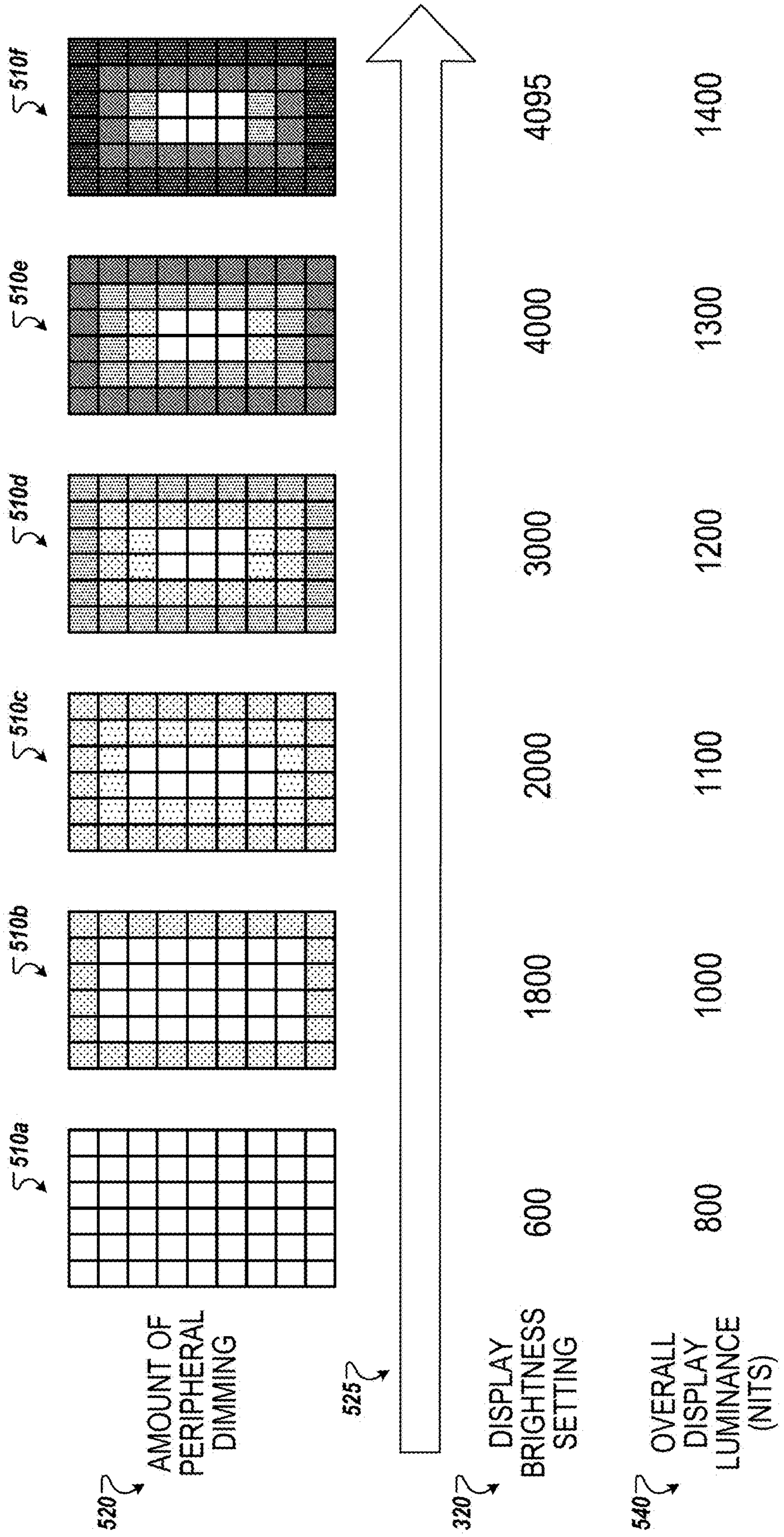
FIG. 5 shows example luminance profiles for peripheral dimming of pixels of a display device.

FIG. 5 shows example luminance profiles for peripheral dimming of pixels of a display device. FIG. 5 shows six example luminance profiles 510*a*, 510*b*, 510*c*, 510*d*, 510*e*, 510*f* ("profiles 510"). The luminance profiles 510 represent example luminance profiles 308 that can be stored by the SoC 105, and selected for application to image data 310, as described with reference to FIG. 3.

The luminance profiles 510 are shown on an example grid. Each grid segment represents a pixel or group of pixels, e.g., of pixel array 112 or of image data 310. The profiles 510 each include different amounts of peripheral dimming. The amount of peripheral dimming increases from left to right across FIG. 5, as represented by arrow 525. In FIG. 5, display brightness setting 320 increases from left to right, from a DBV value of 600 to 4095. The DBV values of 600 to 4095 represent DBV values for an example 12-bit display. The DBV can be set by a user or can be automatically adjusted, e.g., based on stored preferences, brightness rules, and/or battery settings.

Overall display luminance 540 also increases from left to right, from a value of 800 nits to 1400 nits. The overall display luminance 540 can be the brightness output by the display panel 104 when the respective profile is applied at the respective display brightness setting 320. In some examples, the overall display luminance 540 can be an indication of display luminance of undimmed pixels near the center of the display. In an example, with the display brightness setting 320 at 4095, and the profile 510*f* applied, the display panel 104 may output light at an overall display luminance 540 of 1400 nits. The actual luminance of light output by the display panel 104 depends on the colors emitted by the pixels, as specified by the image data 310.

Grid segments of a profile shown with darker shading represent pixels with greater amounts of dimming, relative to center pixels of the profile emitting light of the same color. For example, peripheral pixels of profile 510*f* are shown with darker shading compared to peripheral pixels of profile 510*b*. Therefore, a difference between the luminance of peripheral pixels and center pixels when profile 510*f* is applied, at uniform color, is greater than a difference between the brightness of peripheral pixels and center pixels when profile 510*b* is applied, at uniform color. However, the actual luminance of peripheral pixels when profile 510*f* is applied may be greater than the luminance of peripheral pixels when profile 510*b* is applied, due to the higher brightness setting 320.

Additionally, the actual luminance of peripheral pixels when profile 510*f* is applied may be greater than the actual luminance of center pixels when the profile 510*f* is applied, e.g., if the emitted color is different. For example, the image data 310 may include a darker color, e.g., dark gray, for a center pixel, and a brighter color, e.g., yellow, for a peripheral pixel. When the profile 510*f* is applied to the image data 310, the center pixel image data will not be dimmed, and the peripheral pixel image data will be dimmed. The dimmed image data for the yellow peripheral pixel may still be brighter than the undimmed image data for the dark gray center pixel.

In the example of FIG. 5, profile 510*a* is applied for a display brightness setting 320 of 600 DBV, or a luminance value of 800 nits. Profile 510*a* does not include any peripheral dimming. Thus, when profile 510*a* is applied to the image data 310, the luminance is not changed, such that the modified image data 302 is the same as the image data 310. For a uniform color, the pixels of the pixel array 112 will emit light at the same brightness when the profile 510*a* is applied.

Profile 510*b* is applied for a display brightness setting 320 of 1800 DBV, in order to achieve an overall luminance 540 of 1000 nits. Profile 510*b* includes adjusted luminance values for peripheral pixels. When profile 510*b* is applied to the image data 310, the luminance of the peripheral pixels is changed, such that the modified image data 302 includes lower luminance for pixels of the peripheral portion compared to the luminance of the pixels of the peripheral portion in the image data 310.

Profiles 510*c* to 510*f* show increasing amounts of peripheral dimming. Profile 510*c* is applied for a display brightness setting 320 of 2000 DBV, in order to achieve an overall luminance 540 of 1100 nits. Profile 510*d* is applied for a display brightness setting 320 of 3000 DBV, in order to achieve an overall luminance 540 of 1200 nits. Profile 510*e* is applied for a display brightness setting 320 of 4000 DBV, in order to achieve an overall luminance 540 of 1300 nits. Profile 510*f* is applied for a display brightness setting 320 of 4095 DBV, in order to achieve an overall luminance 540 of 1400 nits.

In some cases, increasing the amount of peripheral dimming can include increasing a difference between dimming at or near the boundary 430 and dimming at or near the edge of the array. For example, for a greater amount of peripheral dimming, a slope of luminance can have a steeper decline across the peripheral portion, in a direction towards the edge of the array. For a lesser amount of peripheral dimming, a slope of luminance can have a more gradual decline across the peripheral portion in the direction towards the edge of the array. Example graphs of luminance profiles are described in greater detail with reference to FIGS. 6A to 6F.

In some cases, increasing the amount of peripheral dimming can include increasing the size of the peripheral portion of the profile. For example, to increase the amount of peripheral dimming, the boundary 430 can be moved towards the center of the array and away from the edge of the array. In some cases, increasing the amount of peripheral dimming can include both (a) increasing the difference between dimming at or near the boundary 430 and dimming at or near the edge of the array, and (b) increasing the size of the peripheral portion.

Although FIG. 5 shows six example profiles 510, more or fewer profiles are possible. In some examples, the SoC 105 can store a collection of luminance profiles 308, with each luminance profile being assigned to a range of display brightness settings 530. For example, the profile 510*b* can be designated for use when the brightness setting 320 is 1800 or greater, and less than 2000. The profile 510*c* can be designated for use when the brightness setting 320 is 2000 or more, and less than 3000. Thus, when the SoC 105 receives, as input, a brightness setting 320 of 1900, the SoC 105 can select to apply the luminance profile 510*b* to the image data.

The luminance profiles applied to the image data can change over time, causing a gradual change in peripheral dimming. In an example scenario, as a user walks from a darker indoor location to a brighter outdoor location with the device 190, the ambient brightness increases. A light sensor of the device 190 detects the increase in brightness, and in response, the SoC 105 changes the display brightness setting 320 to an increased DBV. The SoC 105 then selects a first luminance profile 305 from the memory 306 based on the increased DBV, and applies the first luminance profile 305 to image data 310 for an image frame or series of image frames. The user continues to move towards the brighter outdoor location with the device 190, and the process repeats. The SoC 105 selects and applies a second luminance profile 305 to image data 310 for a following image frame or series of images frames. The second luminance profile 305 has a greater amount of peripheral dimming compared to the first luminance profile. Due to the gradual change in peripheral dimness, the change in uniformity of the image on the display may go unnoticed by the user.

FIGS. 6A to 6F show example graphs 600, 610, 620, 630, 640, 650 that illustrate an effect of multiple different luminance profiles on luminosity of content presented at various regions of a display device. The graphs show display luminance values vs. pixel count. The x-axes represent pixel count as measured between edges of a pixel array, e.g., pixel array 112. For example, referring to FIG. 6A, the edge 608*a* at the x-origin of graph 600 represents a first edge of the pixel array, and the edge 608*b* represents the second edge of the pixel array. The first edge and the second edge can be opposite edges of the pixel array. For example, the first edge and the second edge can be a left edge and a right edge, a top edge and a bottom edge, or opposite diagonal edges of the array. The y-axes represent display luminance. The profiles shown in the graph represent luminance for uniform color across the array.

The graphs 600, 610, 620, 630, 640, 650 shown in FIGS. 6A to 6F each include six luminance profiles. The six luminance profiles of each graph can be, for example, the six profiles 510*a* to 510*f* shown in FIG. 5. For example, referring to FIG. 6A, the graph 600 shows luminance profiles 601, 602, 603, 604, 605, 606 ("profiles 601-606"). The luminance profile 601 can be the graph of luminance values for the profile 510*f*, the luminance profile 602 can be the graph of luminance values for the profile 510*e*, the luminance profile 603 can be the graph of luminance values for the profile 510*d*, the luminance profile 604 can be the graph of luminance values for the profile 510*c*, the luminance profile 605 can be the graph of luminance values for the profile 510*b*, and the luminance profile 606 can be the graph of luminance values for the profile 510*a*.

Each luminance profile of the graphs 600, 610, 620, 630, 640, 650 can be designated for use at a different brightness setting to achieve a different display luminance. For example, referring to graph 600 of FIG. 6A, the luminance profile 601 can be applied to image data to achieve a display luminance of 1400 nits. The luminance profile 602 can be applied to image data to achieve a display luminance of 1300 nits. The luminance profile 603 can be applied to image data to achieve a display luminance of 1200 nits. The luminance profile 604 can be applied to image data to achieve a display luminance of 1000 nits. The luminance profile 605 can be applied to image data to achieve a display luminance of 800 nits. The luminance profile 606 can be applied to image data to achieve a display luminance of 600 nits or less.

The graph 600 shows boundaries 607*a*, 607*b* that separate the center portion from the peripheral portion. Arrow 661 represents a pixel width of the center portion. Arrows 662*a*, 662*b* represent widths of the peripheral portions. As described with reference to FIGS. 4 and 5, the boundaries 607*a*, 607*b* ("boundaries 607") can be moved inwards towards the center to increase the widths 662*a*, 662*b* of the peripheral portions and to decrease the width 661 of the center portion. The boundaries 607 can be moved outwards towards the edges 608 to decrease the widths 662*a*, 662*b* of the peripheral portions and to increase the width 661 of the center portion.

The luminance profiles 601-606 each have a steady luminance across the center portion of the array, e.g., across the width 661. The steady luminance is represented by a horizontal linear profile between the boundaries 607. The luminance profiles 601-606 each have a decreasing luminance between the peripheral boundaries and the array edges. For example, the luminance profiles 601-606 each have a decreasing luminance from boundary 607*a* towards the edge 608*a*, and from the boundary 607*b* towards the edge 608*b*. In the example of graph 600, the luminance values decrease parabolically or logarithmically between the boundaries 607 and the edges 608. In some examples, the luminance values can decrease linearly or according to a polynomial function between the boundaries 607 and the edges 608.

Figure 6A:
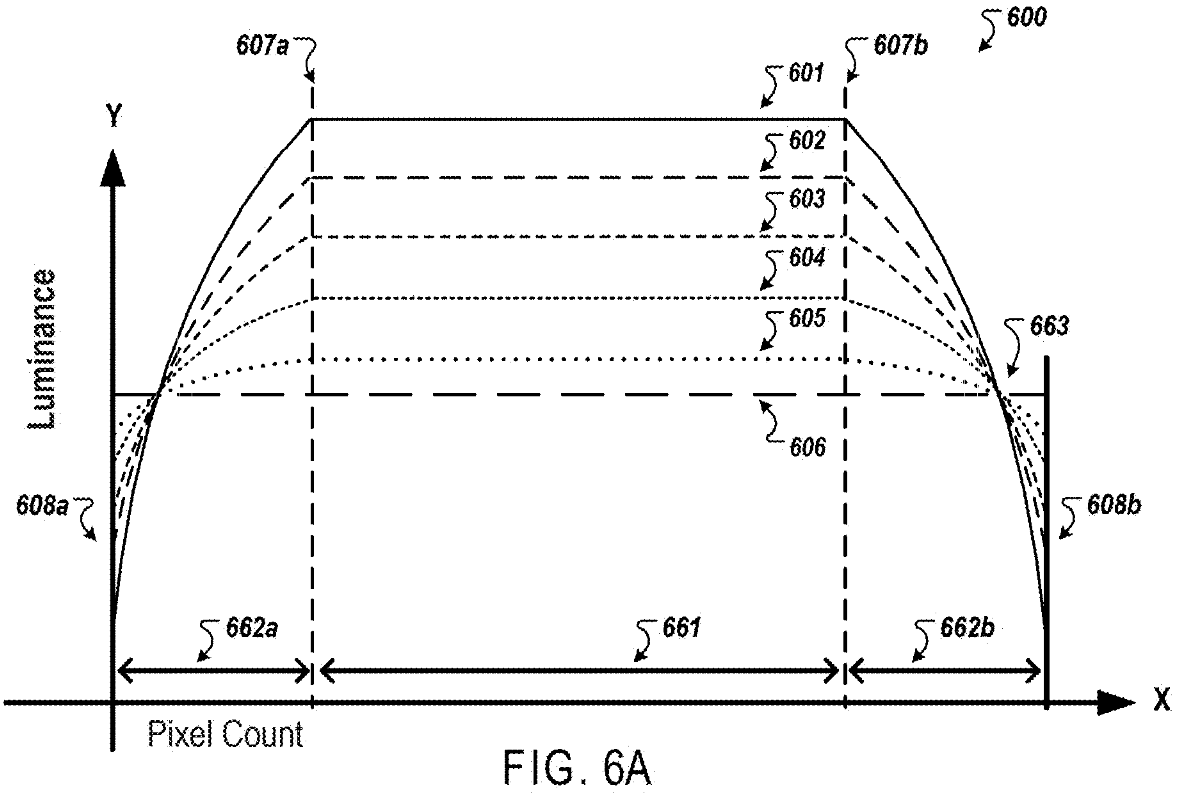
FIGS. 6A to 6F show example graphs that illustrate an effect of multiple different luminance profiles on luminosity of content presented at various regions of a display device.
Figure 6B:
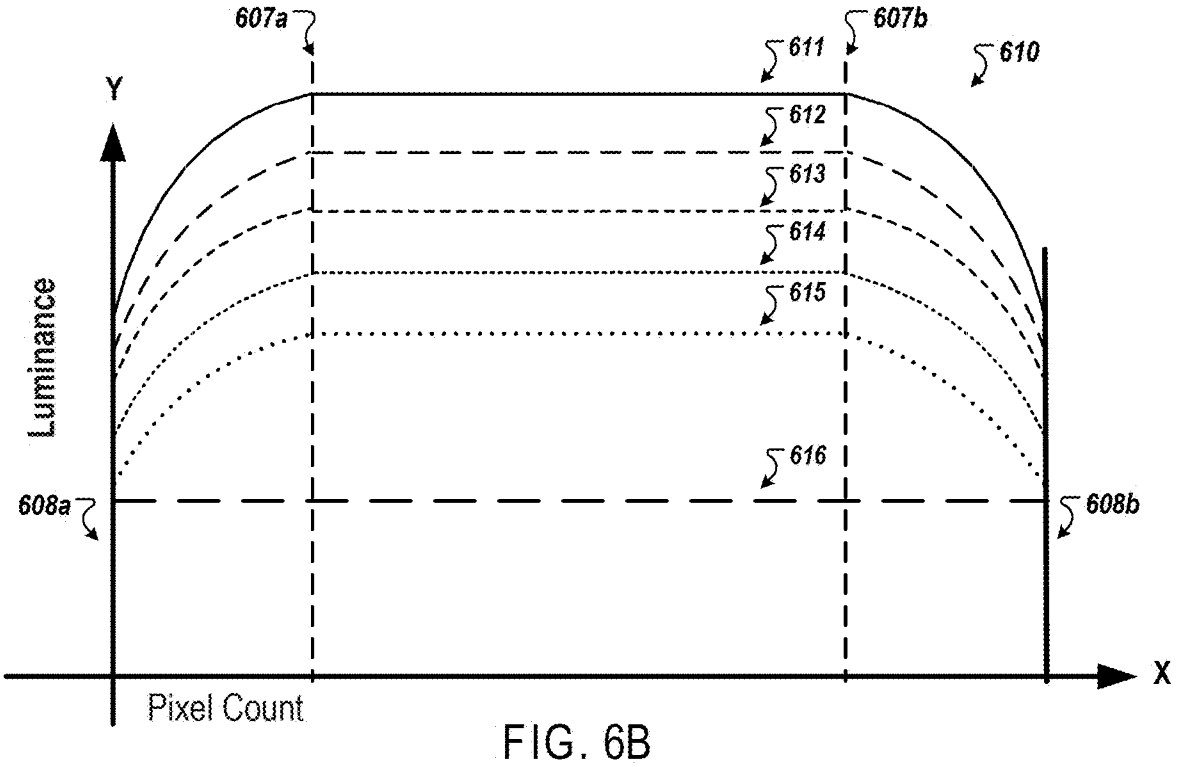

FIG. 6B shows graph 610 with luminance profiles 611, 612, 613, 614, 615, 616 ("profiles 611-616"). The profiles 611-616 are similar to the profiles 601-606. A difference between the profiles 611-616 and the profiles 601-606 is the steepness of the slope of luminance in the peripheral portion and the relative luminance of the edges of the array. The slope of luminance for all profiles in the peripheral portion of graph 600 is equal to or greater than the slope of luminance for the corresponding profiles of graph 610. For example, the slope of luminance for profile 601 in the peripheral portion of graph 600 is steeper than the slope of luminance for profile 611 in the peripheral portion of graph 610.

Additionally, in graph 600, the profile 606, with the lowest center luminance, has the highest edge luminance, while the profile 601, with the highest center luminance, has the lowest edge luminance. The profiles 601-606 cross each other in the peripheral portion, e.g., at point 663. In contrast, in graph 610, the profile 616, with the lowest center luminance, also has the lowest edge luminance, while the profile 611, with the highest center luminance, also has the highest edge luminance. The profiles 611-616 do not cross each other in the peripheral portion.

Figure 6C:
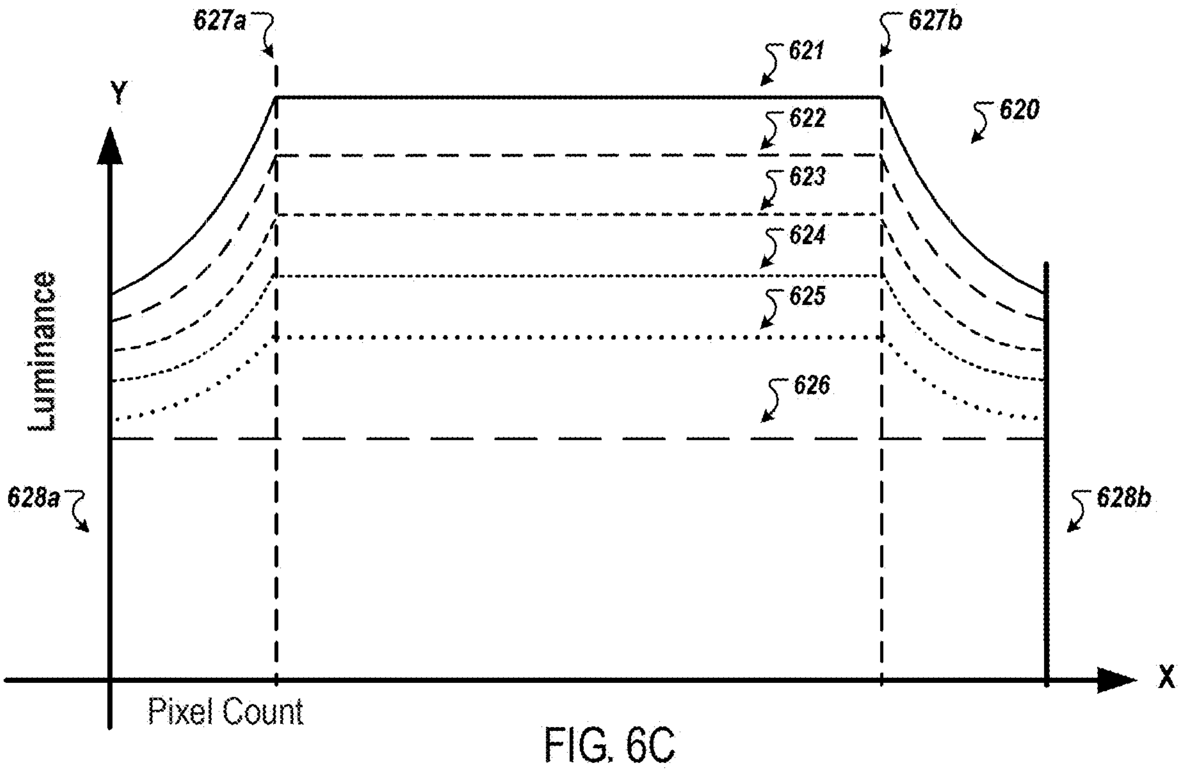

FIG. 6C shows graph 620 with luminance profiles 621, 622, 623, 624, 625, 626 ("profiles 621-626"). The luminance profiles 621-626 each have a steady luminance across the center portion of the array. The luminance profiles 621-626 each have a decreasing luminance between the peripheral boundaries and the array edges. For example, the luminance profiles 621-626 each have a decreasing luminance from boundary 627*a* towards edge 628*a*, and from boundary 627*b* towards edge 628*b*. In the example of graph 620, the luminance values decrease according to a Gaussian or Normal function between the boundaries 607 and the edges 608.

Figure 6D:
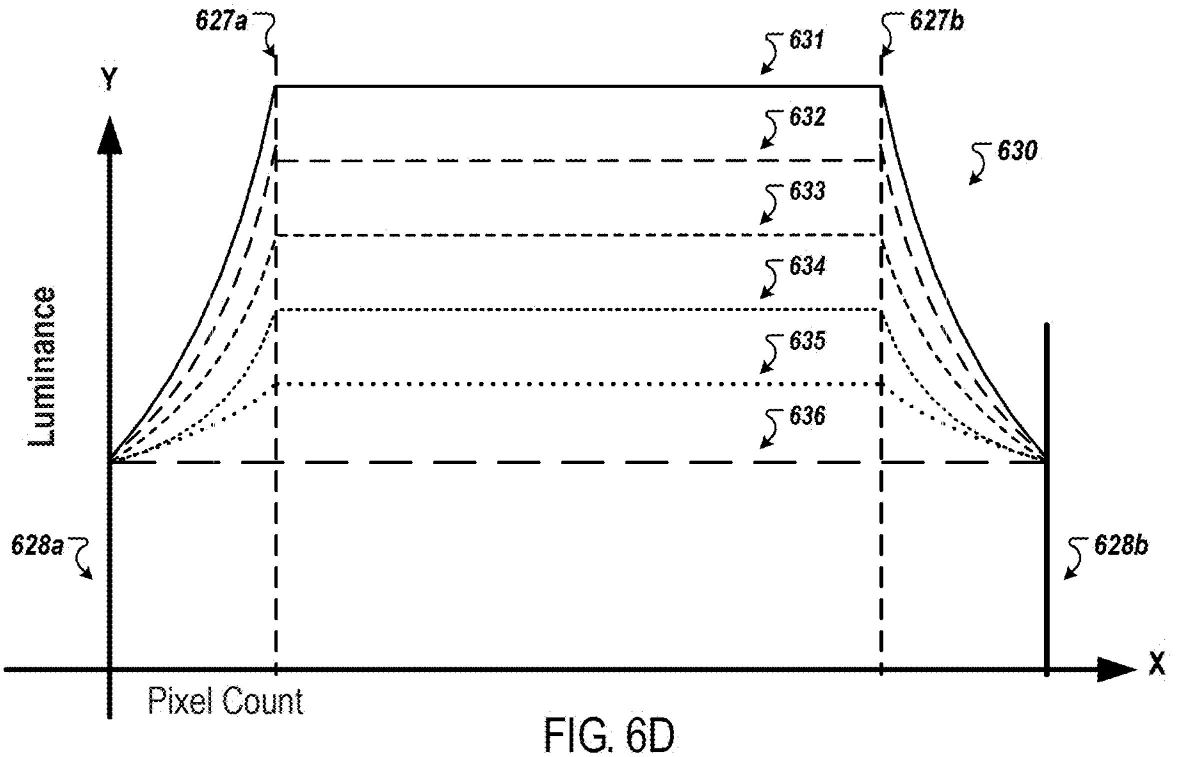

FIG. 6D shows graph 630 with profiles 631, 632, 633, 634, 635, 636 ("profiles 631-636"). The profiles 631-636 are similar to the profiles 621-626. A difference between the profiles 631-636 and the profiles 621-626 is the steepness of the slope of luminance in the peripheral portion and the relative luminance of the edges of the array. The slope of luminance for all profiles in the peripheral portion of graph 630 is equal to or greater than the slope of luminance for the corresponding profiles of graph 620. For example, the slope of luminance for profile 631 in the peripheral portion of graph 630 is steeper than the slope of luminance for profile 621 in the peripheral portion of graph 620.

Additionally, in graph 620, the profile 626, with the lowest center luminance, has the lowest edge luminance, while the profile 621, with the highest center luminance, has the highest edge luminance. In contrast, in graph 630, the profiles 631-636 have the same or similar edge luminance. The profiles 631 to 636 converge at the edges 628*a*, 628*b*.

Figure 6E:
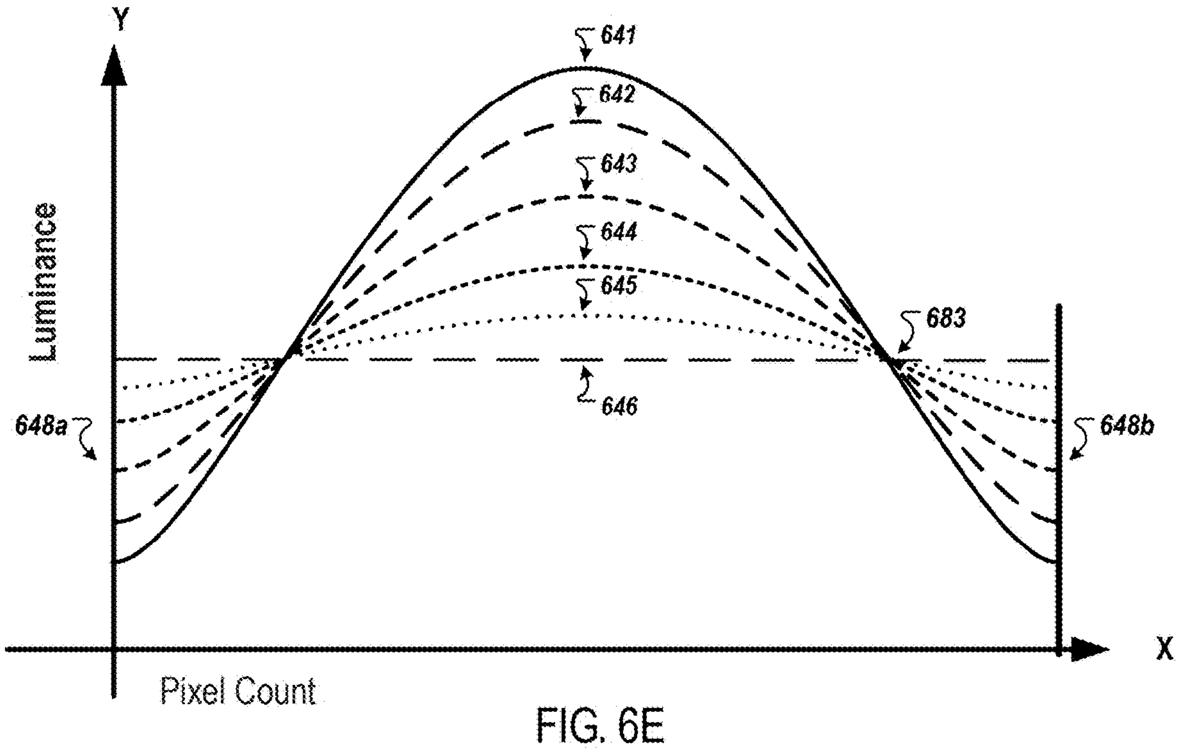

FIG. 6E shows graph 640 with luminance profiles 641, 642, 643, 644, 645, 646 ("profiles 641-646"). The luminance profiles 641-646 each gaussian, or normal, distribution. The luminance profiles 641-646 each have a decreasing luminance between the center of the array and the array edges. The luminance profiles 641-646 do not have definite boundaries between the center portion and the peripheral portion. Rather, the luminance of pixels decreases from a peak in the center of the pixel array, to a nadir at the edges 648*a*, 648*b* of the array.

Figure 6F:
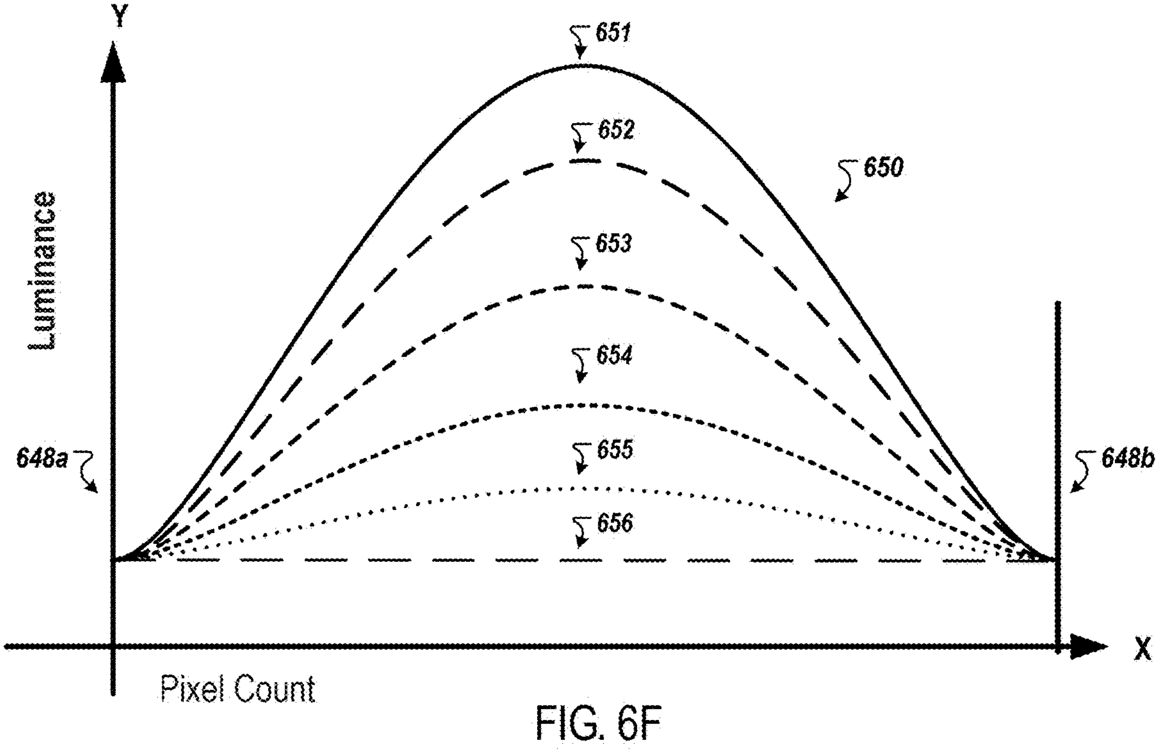

FIG. 6F shows graph 650 with profiles 651, 652, 653, 654, 655, 656 ("profiles 651-656"). The profiles 651-656 are similar to the profiles 641-646. A difference between the profiles 651-656 and the profiles 641-646 is the relative luminance of the edges of the array. For example, in graph 640, the profile 646, with the lowest center luminance, has the highest edge luminance, while the profile 641, with the highest center luminance, has the lowest edge luminance. The profiles 641-646 cross each other, e.g., at point 683. In contrast, in graph 650, the profiles 651-656 have the same or similar edge luminance. The profiles 651-656 converge at the edges 648*a*, 648*b*. The profiles 651-656 do not cross each other in the peripheral portion.

Figure 7:
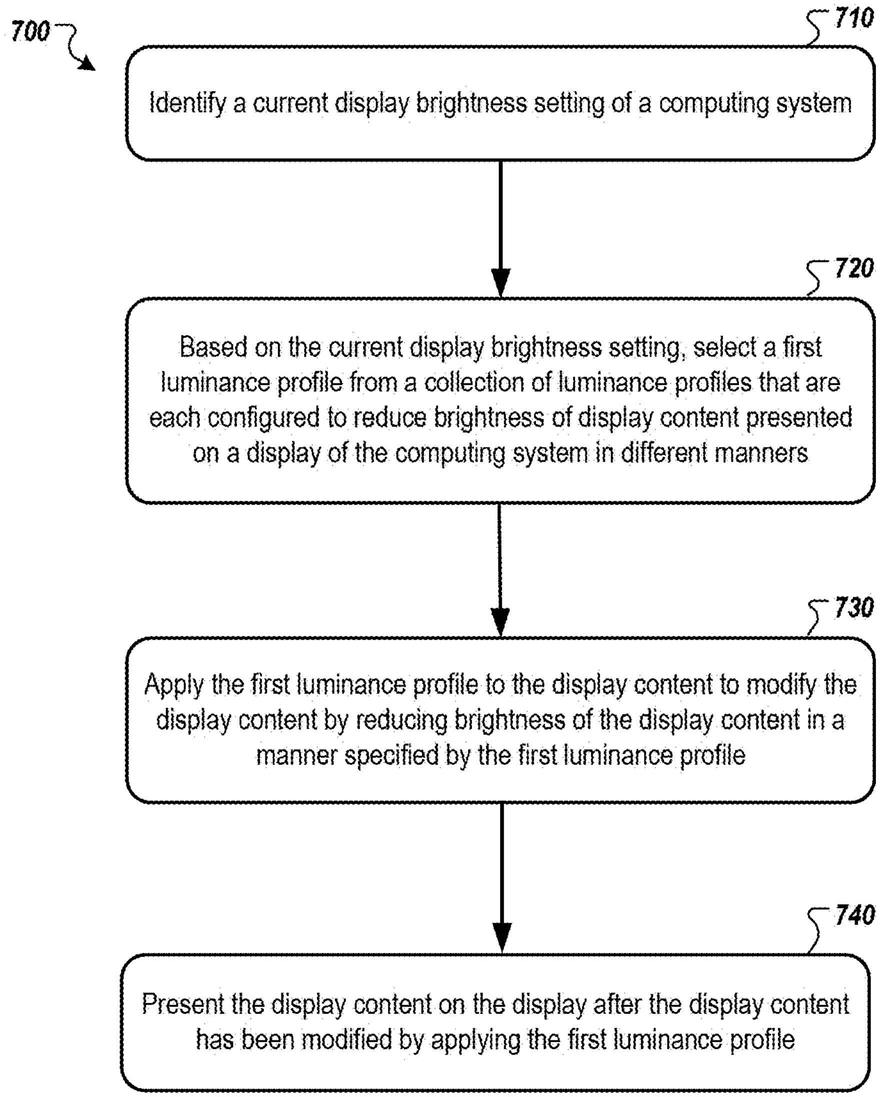
FIG. 7 shows a flowchart of a process for operating a display device with variable peripheral dimness.

FIG. 7 shows a flowchart of a process 700 for operating a display device with variable peripheral dimness. The process may be implemented by a display device or a computing device that includes the display device, for example, to achieve the luminance outputs illustrated by FIG. 5.

A computing system receives display content. For example, the computing system 190 described with respect to FIGS. 1 and 2A-B can receive image data 310, including display content for presentation on the display panel 104 of the device 190.

At box 710, the computing system identifies a current display brightness setting of the computing system. The computing system identifies that a current display brightness setting of the computing system has a first value that represents a first level of display brightness. For example, the device 190 can identify that a current display brightness setting of the computing device 190 has a first value that represents a first level of display brightness.

At box 720, the computing system selects a first luminance profile from a collection of luminance profiles that are each configured to reduce brightness of display content presented on a display of the computing system in different manner. The collection of luminance profiles can be the collection of luminance profiles 308 stored in the memory 306 of the SoC 105. The computing system selects the first luminance profile based on the current display brightness setting having the first value. The first luminance profile specifies a first amount of brightness reduction to a peripheral portion of the display content and a first gradient of brightness reduction to a portion of the display content between the peripheral portion of the display content and a center portion of the display content.

In some examples, the computing system can apply the first luminance profile to the first frame of image data line by line as the image data is being provided from an SoC to a DDIC of the computing system. In some examples, the first luminance profile includes an image mask that specifies differing levels of dimming at different portions of the image mask. In some examples, the image mask specifies a gradient of differing levels of dimming that extends, with increasing levels of dimming, away from the center of the image mask towards a peripheral edge of the image mask. In some examples, the luminance profile includes a function that specifies how different portions of the image data 310 are to be dimmed.

At box 730, the computing system applies the first luminance profile to the display content to modify the display content by reducing brightness of the display content in a manner specified by the first luminance profile. Applying the first luminance profile to the display content modifies the display content by reducing a brightness of the peripheral portion of the display content by the first amount of brightness reduction and reduces the brightness of the portion of the display content between the peripheral portion of the display content and the center portion of the display content according to the first gradient of brightness reduction. The peripheral portion of the display content is configured for presentation by a peripheral portion of the display device. For example, the peripheral portion of the display content can be configured for presentation by the peripheral portion 420 of the display panel 104. In some examples, pixels in the peripheral portion 420 are dimmed while retaining image content of the image data 310.

At box 740, the computing system presents the display content on the display after the display content has been modified by applying the first luminance profile. The computing system presents the image data 310 after the image data 310 has been modified to dim the brightness of the display content as specified by the selected luminance profile.

In some examples, the computing system receives user input that interacts with the display device to change the current display brightness setting from the first value to a second value. In some examples, the display device can present a user interface including a display brightness slider. The user input can include user contact with the display device that drags an element of a display brightness slider from a first location to a second location. For example, the user contact can draft the element of the slide towards a location that represents an increased brightness.

For preceding or subsequent image data, the computing system is configured to select a second luminance profile from the collection of luminance profiles and apply the second luminance profile to the display content based on the current display brightness setting having the second value that represents a second level of display brightness. The second level of display brightness may be greater than or less than the first level of display brightness. The second luminance profile may specify an amount of peripheral dimming that is greater or less than the amount of peripheral dimming specified by the first luminance profile.

Figure 8:
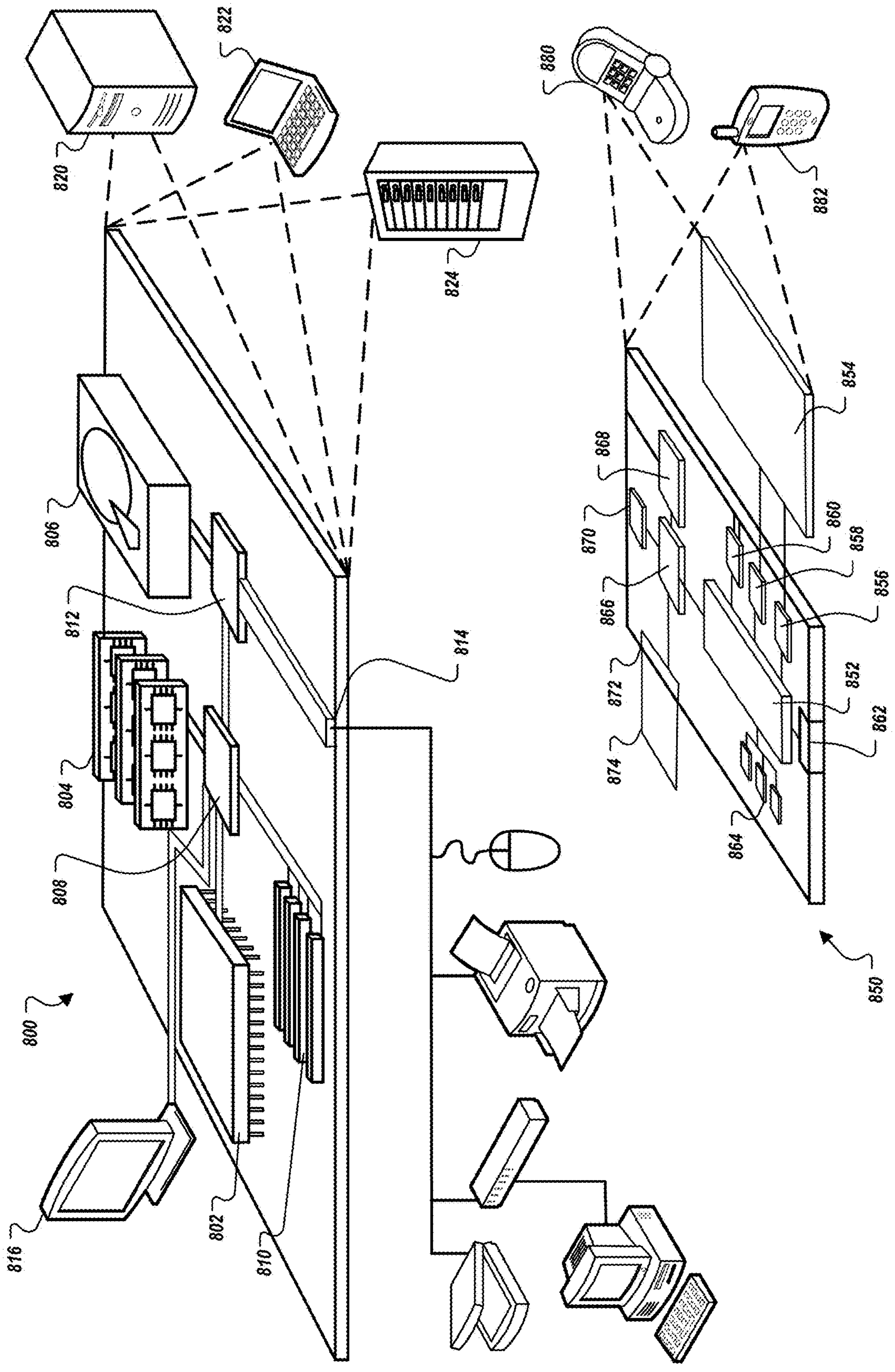
FIG. 8 shows a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed controller 808 connecting to memory 804 and high-speed expansion ports 810, and a low speed controller 812 connecting to low speed expansion port 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may be provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, tablet, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method for presenting display content, the method comprising:

receiving a first frame of display content for presentation on a display device of a computing device;

identifying that a display brightness setting of the computing device has a first value that represents a first level of display brightness;

modifying the first frame of display content to dim a brightness of a peripheral portion of the first frame of display content by a first amount, based on the display brightness setting having the first value, wherein the peripheral portion of the first frame of display content is configured for presentation by a peripheral portion of the display device;

presenting the first frame of display content on the display device, after the first frame of display content has been modified to dim the brightness of the peripheral portion of the first frame by the first amount;

receiving a second frame of display content for presentation on the display device;

identifying that the display brightness setting has a second value that represents a second level of display brightness that is greater than the first level of display brightness;

modifying the second frame of display content to dim a brightness of a peripheral portion of the second frame of display content by a second amount that is greater than the first amount, based on the display brightness setting having the second value, wherein the peripheral portion of the second frame of display content is configured for presentation by the peripheral portion of the display device such that the peripheral portion of the second frame corresponds to the peripheral portion of the first frame; and presenting the second frame of display content on the display device, after the second frame of display content has been modified to dim the brightness of the peripheral portion of the second frame by the second amount that is greater than the first amount.

2. The method of claim 1, wherein:

dimming the brightness of the peripheral portion of the first frame by the first amount includes reducing a brightness level of multiple first pixels within the peripheral portion of the first frame while retaining image content represented by the multiple first pixels; and dimming the brightness of the peripheral portion of the second frame by the second amount includes reducing a brightness level of multiple second pixels within the peripheral portion of the second frame while retaining image content represented by the second frame.

3. The method of claim 1, wherein:

modifying the first frame to dim the brightness of the peripheral portion of the first frame by the first amount includes the computing device:

selecting a first luminance profile from a collection of luminance profiles, based on the display brightness setting having the first value; and applying the first luminance profile to the first frame; and modifying the second frame to dim the brightness of the peripheral portion of the second frame by the second amount includes the computing device:

selecting a second luminance profile from the collection of luminance profiles, based on the display brightness setting having the second value; and applying the second luminance profile to the second frame, wherein the second luminance profile specifies an amount of peripheral dimming that is greater than an amount of peripheral dimming specified by the first luminance profile.

4. The method of claim 3, wherein:

the first luminance profile includes a first image mask that specifies differing levels of dimming at different portions of the first image mask; and the second luminance profile includes a second image mask that specifies differing levels of dimming at different portions of the second image mask.

5. The method of claim 4, wherein:

the first image mask specifies a first gradient of differing levels of dimming that extends, with increasing levels of dimming, away from a center of the first image mask towards a peripheral edge of the first image mask; and the second image mask specifies a second gradient of differing levels of dimming that extends, with increasing levels of dimming, away from a center of the second image mask towards a peripheral edge of the second image mask.

6. The method of claim 3, wherein:

the first luminance profile includes a first function that specifies how different portions of an image frame are to be dimmed; and the second luminance profile includes a second function that specifies how different portions of an image frame are to be dimmed.

7. The method of claim 3, wherein:

receiving a third frame of display content for presentation on the display device;

identifying that the display brightness setting of the computing device has a third value that represents a third level of display brightness that is lower than the first level of display brightness and lower than the second level of display brightness; and presenting the third frame of display content on the display device, without having applied any luminance profile from the collection of luminance profile, or after having applied to the third frame a third luminance profile from the collection of luminance profiles that represents a least amount of dimming from among the luminance profiles in the collection of luminance profiles.

8. The method of claim 1, wherein:

the peripheral portion of the display device surrounds and excludes a center portion of the display device;

the peripheral portion of the first frame surrounds and excludes a center portion of the first frame; and the peripheral portion of the second frame surrounds and excludes a center portion of the second frame.

9. The method of claim 8, wherein:

the first amount by which the peripheral portion of first frame is dimmed represents an amount that the peripheral portion of the first frame is dimmed more than an amount that the center portion of the first frame is dimmed; and the second amount by which the peripheral portion of the second frame is dimmed represents an amount that the peripheral portion of the second frame is dimmed more than an amount that the center portion of the second frame is dimmed.

10. The method of claim 9, wherein:
the first amount by which the peripheral portion of first frame is dimmed represents a first proportion between an amount that the peripheral portion of the first frame is dimmed with respect to an amount that the center portion of the first frame is dimmed; and
the second amount by which the brightness of the second frame is dimmed represents a second proportion between an amount that the peripheral portion of the second frame is dimmed with respect to an amount that the center portion of the second frame is dimmed.

11. The method of claim 8, wherein:
the first amount that the peripheral portion of the first frame of content is dimmed is greater than an amount that the center portion of the first frame was dimmed; and
the second amount that the peripheral portion of the second frame of content is dimmed is greater than an amount that the center portion of the second frame was dimmed.

12. The method of claim 11, wherein:
the second amount that the peripheral portion of the second frame of content is dimmed is greater in absolute and relative amounts of brightness reduction than the first amount that the peripheral portion of the first frame of content is dimmed.

13. The method of claim 8, comprising:
receiving a third frame of display content for presentation on a display device of a computing device;
identifying that the display brightness setting of the computing device has a third value that represents a third level of display brightness that is lower than the first level of display brightness and that is lower than the second level of display brightness; and
presenting the first frame of display content on the display device, after the first frame of display content has been modified to dim the brightness of the peripheral portion of the first frame by the first amount.

14. The method of claim 1, comprising:
receiving, by the computing device, user input that interacts with the display device to change the display brightness setting from the first value to the second value.

15. The method of claim 14, wherein:
the user input that changes the display brightness setting from the first value to the second value includes user contact with the display device that drags an element of a display brightness slider from a first location to a second location.

16. The method of claim 1, comprising:
receiving, by the computing device, an indication that an amount of light sensed by a light sensor of the computing device has decreased; and
modifying, by the computing device, the display brightness setting from the first level to the second level as a result of having received the indication that the amount of light sensed by the light sensor has decreased.

17. The method of claim 1, wherein:
modifying the first frame to dim the peripheral portion of the first frame is performed by one or more processors of the computing device; and
modifying the second frame to dim the peripheral portion of the second frame is performed by the one or more processors of the computing device.

18. The method of claim 1, wherein:
presenting the first frame includes one or more processors of the computing device sending the first frame to a display driver integrated circuit of the display device for presentation; and
presenting the second frame includes the one or more processors of the computing device sending the second frame to the display driver integrated circuit of the display device for presentation.

19. A computing device, comprising:
a display device;
one or more processors; and
one or more computer-readable devices including instructions that, when executed by the one or more processors, cause the computing device to perform operations that include:
receiving a first frame of display content for presentation on the display device;
identifying that a display brightness setting of the computing device has a first value that represents a first level of display brightness;
modifying the first frame of display content to dim a brightness of a peripheral portion of the first frame of display content by a first amount, based on the display brightness setting having the first value, wherein the peripheral portion of the first frame of display content is configured for presentation by a peripheral portion of the display device;
presenting the first frame of display content on the display device, after the first frame of display content has been modified to dim the brightness of the peripheral portion of the first frame by the first amount;
receiving a second frame of display content for presentation on the display device;
identifying that the display brightness setting has a second value that represents a second level of display brightness that is greater than the first level of display brightness;
modifying the second frame of display content to dim a brightness of a peripheral portion of the second frame of display content by a second amount that is greater than the first amount, based on the display brightness setting having the second value, wherein the peripheral portion of the second frame of display content is configured for presentation by the peripheral portion of the display device such that the peripheral portion of the second frame corresponds to the peripheral portion of the first frame; and
presenting the second frame of display content on the display device, after the second frame of display content has been modified to dim the brightness of the peripheral portion of the second frame by the second amount that is greater than the first amount.

* * * * *